US012613109B2

(12) United States Patent
Suzuki et al.

(10) Patent No.: US 12,613,109 B2
(45) Date of Patent: Apr. 28, 2026

(54) ANGLE DETECTION APPARATUS, ANGLE DETECTION SYSTEM, PARK LOCK SYSTEM, AND PEDAL SYSTEM

(71) Applicant: TDK CORPORATION, Tokyo (JP)

(72) Inventors: Keiji Suzuki, Tokyo (JP); Toshio Ishikawara, Tokyo (JP); Takahiro Moriya, Tokyo (JP); Toshihiko Oyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/588,859

(22) Filed: Jan. 31, 2022

(65) Prior Publication Data

US 2022/0307863 A1    Sep. 29, 2022

(30) Foreign Application Priority Data

Mar. 24, 2021    (JP) ................................. 2021-050626
Mar. 24, 2021    (JP) ................................. 2021-050627

(51) Int. Cl.
 *G01D 5/14* (2006.01)
 *B60T 7/04* (2006.01)
(52) U.S. Cl.
 CPC ................ *G01D 5/14* (2013.01); *B60T 7/045* (2013.01); *B60T 2220/04* (2013.01)
(58) Field of Classification Search
 CPC ...................................................... G01D 5/14
 See application file for complete search history.

(56) References Cited

U.S. PATENT DOCUMENTS

| | | | | | |
|---|---|---|---|---|---|
| 4,283,679 | A | * | 8/1981 | Ito ........................... | G01P 13/04 |
| | | | | | 340/672 |
| 5,148,106 | A | * | 9/1992 | Ozawa ................... | G01D 5/145 |
| | | | | | 324/252 |
| 6,724,185 | B2 | * | 4/2004 | Ooki ...................... | G01D 5/145 |
| | | | | | 324/207.2 |
| 6,806,702 | B2 | * | 10/2004 | Lamb ..................... | G01D 5/145 |
| | | | | | 324/207.2 |

(Continued)

FOREIGN PATENT DOCUMENTS

| | | | | | |
|---|---|---|---|---|---|
| DE | 102009051978 | A1 | * | 5/2011 | ............. G01D 3/028 |
| JP | H05-126512 | A | | 5/1993 | |

(Continued)

OTHER PUBLICATIONS

English Translation of Feb. 14, 2023 Notice of Reasons for Refusal issued in Japanese Patent Application No. 2021-050626.

(Continued)

*Primary Examiner* — Walter L Lindsay, Jr.
*Assistant Examiner* — Milton Gonzalez
(74) *Attorney, Agent, or Firm* — Oliff PLC

(57) ABSTRACT

An angle detection apparatus includes a magnetic detection element, a magnetic field generator, and a first magnetic shield. The magnetic field generator is magnetized along a first direction and generates a magnetic field to be applied to the magnetic detection element. The first magnetic shield surrounds the magnetic detection element along a plane orthogonal to the first direction. The magnetic field generator and the magnetic detection element are rotatable relative to each other around a rotation axis along the first direction.

36 Claims, 18 Drawing Sheets

(56) References Cited

U.S. PATENT DOCUMENTS

| | | | | |
|---|---|---|---|---|
| 6,867,584 | B1 * | 3/2005 | Kurita | G01D 5/147 |
| | | | | 324/252 |
| 6,930,477 | B1 * | 8/2005 | Kurita | G01D 5/145 |
| | | | | 324/252 |
| 7,375,510 | B2 | 5/2008 | Miyata et al. | |
| 7,417,421 | B2 * | 8/2008 | Wendt | G01D 5/145 |
| | | | | 324/207.21 |
| 8,423,232 | B2 * | 4/2013 | Tsutsumi | F16H 63/3491 |
| | | | | 477/34 |
| 8,461,829 | B2 * | 6/2013 | Steinich | G01D 11/245 |
| | | | | 324/207.2 |
| 8,847,584 | B2 * | 9/2014 | Steinich | G01D 5/04 |
| | | | | 324/207.2 |
| 9,062,988 | B2 * | 6/2015 | Steinich | G01D 5/145 |
| 10,274,341 | B2 | 4/2019 | Makiuchi et al. | |
| 10,859,405 | B2 | 12/2020 | Ohta et al. | |
| 2015/0323346 | A1 * | 11/2015 | Maiterth | G01D 5/145 |
| | | | | 324/207.25 |
| 2020/0158791 | A1 * | 5/2020 | Marauska | H10N 50/01 |
| 2021/0048320 | A1 * | 2/2021 | Marauska | G01D 5/16 |
| 2023/0003267 | A1 * | 1/2023 | Honda | G01B 7/00 |

FOREIGN PATENT DOCUMENTS

| | | | | | | |
|---|---|---|---|---|---|---|
| JP | H10-038507 | A | | 2/1998 | | |
| JP | 2000074615 | A | * | 3/2000 | | |
| JP | 2004-257894 | A | | 9/2004 | | |
| JP | 2004-361119 | A | | 12/2004 | | |
| JP | 2005-147926 | A | | 6/2005 | | |
| JP | 2005-147971 | A | | 6/2005 | | |
| JP | 2006-208252 | A | | 8/2006 | | |
| JP | 2006317336 | A | * | 11/2006 | | |
| JP | 2009-025222 | A | | 2/2009 | | |
| JP | 2011-252836 | A | | 12/2011 | | |
| JP | 2015-169439 | A | | 9/2015 | | |
| JP | 2019-095375 | A | | 6/2019 | | |
| JP | 2022-148808 | A | | 10/2022 | | |
| JP | 2022-148809 | A | | 10/2022 | | |
| WO | WO-2013145644 | A1 | * | 10/2013 | | G01D 5/145 |

OTHER PUBLICATIONS

English Translation of Feb. 14, 2023 Notice of Reasons for Refusal issued in Japanese Patent Application No. 2021-050627.

May 23, 2023 Office Action issued in Japanese Patent Application No. 2021-050626 (English translation).

Translation of Oct. 25, 2024 Office Action issued in Chinese Patent Application No. 202210167896.7.

Translation of Mar. 28, 2025 Office Action issued in Chinese Patent Application No. 202210167896.7.

* cited by examiner

110B 15   14   14T   12K1   11   12K2   132 } 13
                                        131

12 { 122
     121

200        200

S   N        N   S

Lv1

Lv2   Lv1

Lv4   Lv3   J1

200K

200

10B 15  14  14T  12K1  11  12K2  132  13
32B  31B  131

12 { 122  121

N        S
S        N

Z
Y → X

Lv1  Lv2  Lv3  Lv4  21
22  4

J1

Y
Z → X

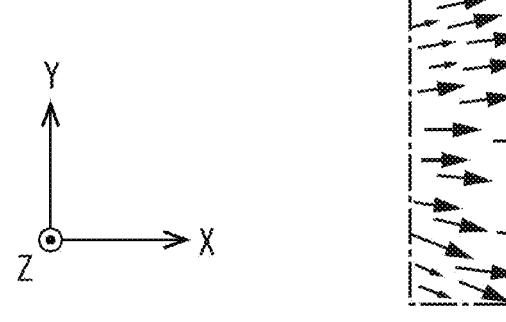
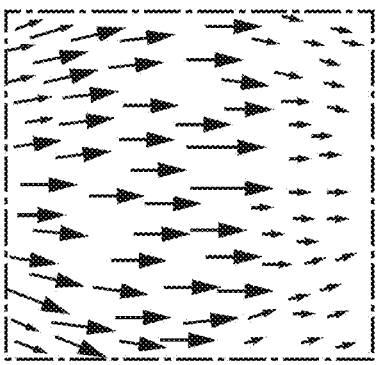
FIG. 12A
FIG. 12B

ANGLE DETECTION APPARATUS, ANGLE DETECTION SYSTEM, PARK LOCK SYSTEM, AND PEDAL SYSTEM

CROSS-REFERENCE TO RELATED APPLICATIONS

The present application claims priority from Japanese Patent Application Nos. 2021-050626 and 2021-050627, both filed on Mar. 24, 2021, the entire contents of each of which are incorporated herein by reference.

BACKGROUND

The technology relates to an angle detection apparatus, an angle detection system, a park lock system, and a pedal system that each include a magnetic detection element.

An angle detection apparatus suitable for a sensor such as a throttle position sensor has been proposed. The throttle position sensor detects a throttle valve position in an internal combustion engine, for example. Reference is made to, for example, Japanese Unexamined Patent Application Publication (JP-A) No. 2006-208252. In the angle detection apparatus disclosed in JP-A No. 2006-208252, a change in magnetic flux generated by a rotating magnetic field generator is detectable with a spin-valve giant magnetoresistive effect (SV-GMR) element.

Further, a magnetic-detection-type encoder has been proposed that includes a magnetic detection element detecting magnetism, a magnet for generating a magnetic field necessary to operate the magnetic detection element, and a magnetic shield cover covering the magnetic detection element and the magnet. Reference is made to, for example, JP-A No. 2015-169439.

SUMMARY

An angle detection apparatus according to one embodiment of the technology includes a magnetic detection element, a magnetic field generator, and a first magnetic shield. The magnetic field generator is magnetized along a first direction and generates a magnetic field to be applied to the magnetic detection element. The first magnetic shield surrounds the magnetic detection element along a plane orthogonal to the first direction. The magnetic field generator and the magnetic detection element are rotatable relative to each other around a rotation axis along the first direction.

An angle detection system according to one embodiment of the technology includes an angle detection apparatus, a first support, and a second support. The angle detection apparatus includes a magnetic detection element, a magnetic field generator, and a first magnetic shield. The magnetic field generator is magnetized along a first direction and generates a magnetic field to be applied to the magnetic detection element. The first magnetic shield surrounds the magnetic detection element along a plane orthogonal to the first direction. The magnetic field generator and the magnetic detection element are rotatable relative to each other around a rotation axis along the first direction. The first support supports the magnetic field generator. The second support supports the first magnetic shield.

A park lock system according to one embodiment of the technology includes an angle detection system. The angle detection system includes an angle detection apparatus, a first support, and a second support. The angle detection apparatus includes a magnetic detection element, a magnetic field generator, and a first magnetic shield. The magnetic field generator is magnetized along a first direction and generates a magnetic field to be applied to the magnetic detection element. The first magnetic shield surrounds the magnetic detection element along a plane orthogonal to the first direction. The magnetic field generator and the magnetic detection element are rotatable relative to each other around a rotation axis along the first direction. The first support supports the magnetic field generator. The second support supports the first magnetic shield.

A pedal system according to one embodiment of the technology includes an angle detection system. The angle detection system includes an angle detection apparatus, a first support, and a second support. The angle detection apparatus includes a magnetic detection element, a magnetic field generator, and a first magnetic shield. The magnetic field generator is magnetized along a first direction and generates a magnetic field to be applied to the magnetic detection element. The first magnetic shield surrounds the magnetic detection element along a plane orthogonal to the first direction. The magnetic field generator and the magnetic detection element are rotatable relative to each other around a rotation axis along the first direction. The first support supports the magnetic field generator. The second support supports the first magnetic shield.

According to the angle detection apparatus, the angle detection system, the park lock system, and the pedal system of the respective embodiments described above, the magnetic detection element is shielded from a disturbance magnetic field because the first magnetic shield surrounds the magnetic detection element. Further, because the magnetic field generator is magnetized along the first direction, a magnetic flux of the magnetic field generated by the magnetic field generator is not easily absorbed by the first magnetic shield. Accordingly, the magnetic field generated by the magnetic field generator is effectively applied to the magnetic detection element. Further, because the magnetic field generator is magnetized along the first direction, the magnetic field to be applied to the magnetic detection element becomes higher in magnetic flux density than in a case where the magnetic field generator is magnetized in an in-plane direction orthogonal to the first direction, for example.

An angle detection apparatus according to one embodiment of the technology includes a magnetic detection element, a magnetic field generator, and a yoke. The magnetic field generator generates a magnetic field to be applied to the magnetic detection element. The yoke is disposed between the magnetic detection element and the magnetic field generator in a first direction. The magnetic detection element and a combination of the magnetic field generator and the yoke are rotatable relative to each other around a rotation axis along the first direction. In a plane orthogonal to the rotation axis, the yoke has a plan shape that is curved in an arc shape along a circumferential direction of a circle centered around the rotation axis. The yoke includes a portion that increases in dimension in the first direction with increasing distance from the rotation axis along the plane orthogonal to the rotation axis.

An angle detection system according to one embodiment of the technology includes an angle detection apparatus and a support. The angle detection apparatus includes a magnetic detection element, a magnetic field generator, and a yoke. The magnetic field generator generates a magnetic field to be applied to the magnetic detection element. The yoke is disposed between the magnetic detection element and the magnetic field generator in a first direction. The magnetic detection element and a combination of the magnetic field generator and the yoke are rotatable relative to each other around a rotation axis along the first direction. In a plane orthogonal to the rotation axis, the yoke has a plan shape that is curved in an arc shape along a circumferential direction of a circle centered around the rotation axis. The yoke includes a portion that increases in dimension in the first direction with increasing distance from the rotation axis along the plane orthogonal to the rotation axis. The support has an attachment hole. The yoke is provided on the magnetic field generator or on the support.

A park lock system according to one embodiment of the technology includes an angle detection system. The angle detection system includes an angle detection apparatus and a support. The angle detection apparatus includes a magnetic detection element, a magnetic field generator, and a yoke. The magnetic field generator generates a magnetic field to be applied to the magnetic detection element. The yoke is disposed between the magnetic detection element and the magnetic field generator in a first direction. The magnetic detection element and a combination of the magnetic field generator and the yoke are rotatable relative to each other around a rotation axis along the first direction. In a plane orthogonal to the rotation axis, the yoke has a plan shape that is curved in an arc shape along a circumferential direction of a circle centered around the rotation axis. The yoke includes a portion that increases in dimension in the first direction with increasing distance from the rotation axis along the plane orthogonal to the rotation axis. The support has an attachment hole. The yoke is provided on the magnetic field generator or on the support.

A pedal system according to one embodiment of the technology includes an angle detection system. The angle detection system includes an angle detection apparatus and a support. The angle detection apparatus includes a magnetic detection element, a magnetic field generator, and a yoke. The magnetic field generator generates a magnetic field to be applied to the magnetic detection element. The yoke is disposed between the magnetic detection element and the magnetic field generator in a first direction. The magnetic detection element and a combination of the magnetic field generator and the yoke are rotatable relative to each other around a rotation axis along the first direction. In a plane orthogonal to the rotation axis, the yoke has a plan shape that is curved in an arc shape along a circumferential direction of a circle centered around the rotation axis. The yoke includes a portion that increases in dimension in the first direction with increasing distance from the rotation axis along the plane orthogonal to the rotation axis. The support has an attachment hole. The yoke is provided on the magnetic field generator or on the support.

According to the angle detection apparatus, the angle detection system, the park lock system, and the pedal system of the respective embodiments described above, in a plane orthogonal to the rotation axis, the yoke has a plan shape that is curved in an arc shape along the circumferential direction of a circle centered around the rotation axis. Further, the yoke includes a portion that increases in dimension in the first direction with increasing distance from the rotation axis along the plane orthogonal to the rotation axis. Accordingly, for example, even in a case where there occurs a displacement of a relative position between the magnetic detection element and the combination of the magnetic field generator and the yoke, the displacement has a less influence on a detection angle error of the magnetic detection element.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 12A is a contour diagram schematically illustrating a magnetic flux density distribution of the magnetic field component in the direction in which two magnets are opposed to each other in an angle detection apparatus of Experiment Example 2-4.

FIG. 12B is an explanatory diagram schematically illustrating vectors of the magnetic flux density distribution in a plane orthogonal to the rotation axis in the angle detection apparatus of Experiment Example 2-4.

DETAILED DESCRIPTION

Figure 1A:
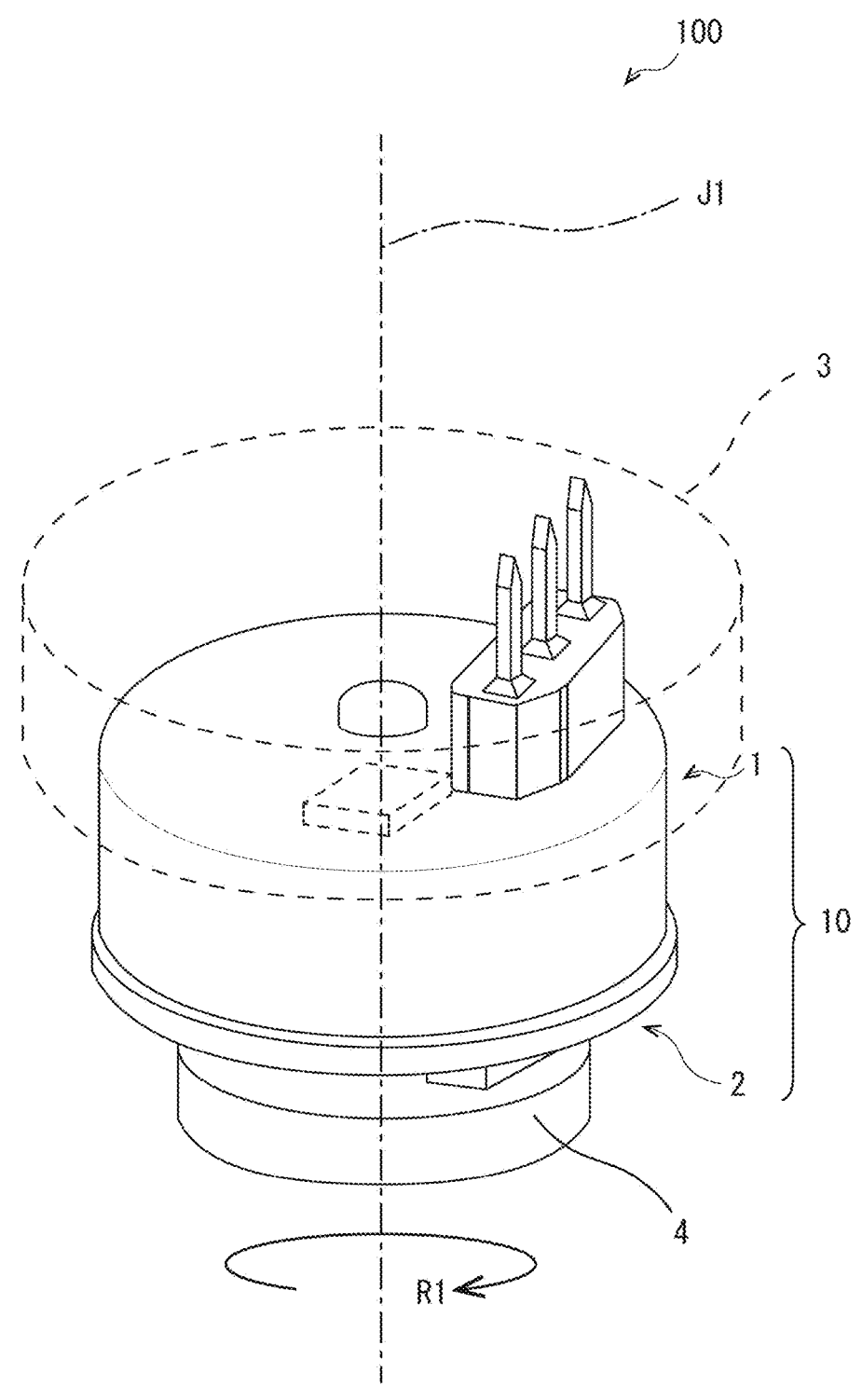
FIG. 1A is a schematic perspective diagram illustrating an overall configuration example of an angle detection system according to one example embodiment of the technology.

A further improvement in angle detection accuracy is demanded of an angle detection apparatus.

It is desirable to provide an angle detection apparatus, an angle detection system, a park lock system, and a pedal system that are each able to achieve high detection accuracy.

In the following, some example embodiments of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. Note that the description is given in the following order.

1. Example Embodiment
2. Experiment Examples
3. Application Examples
4. Other Modification Examples

1. EXAMPLE EMBODIMENT

[Configuration of Angle Detection System 100]

First, a configuration of an angle detection system 100 according to an example embodiment of the technology will be described with reference to FIG. 1A to FIG. 3.

Figure 1B:
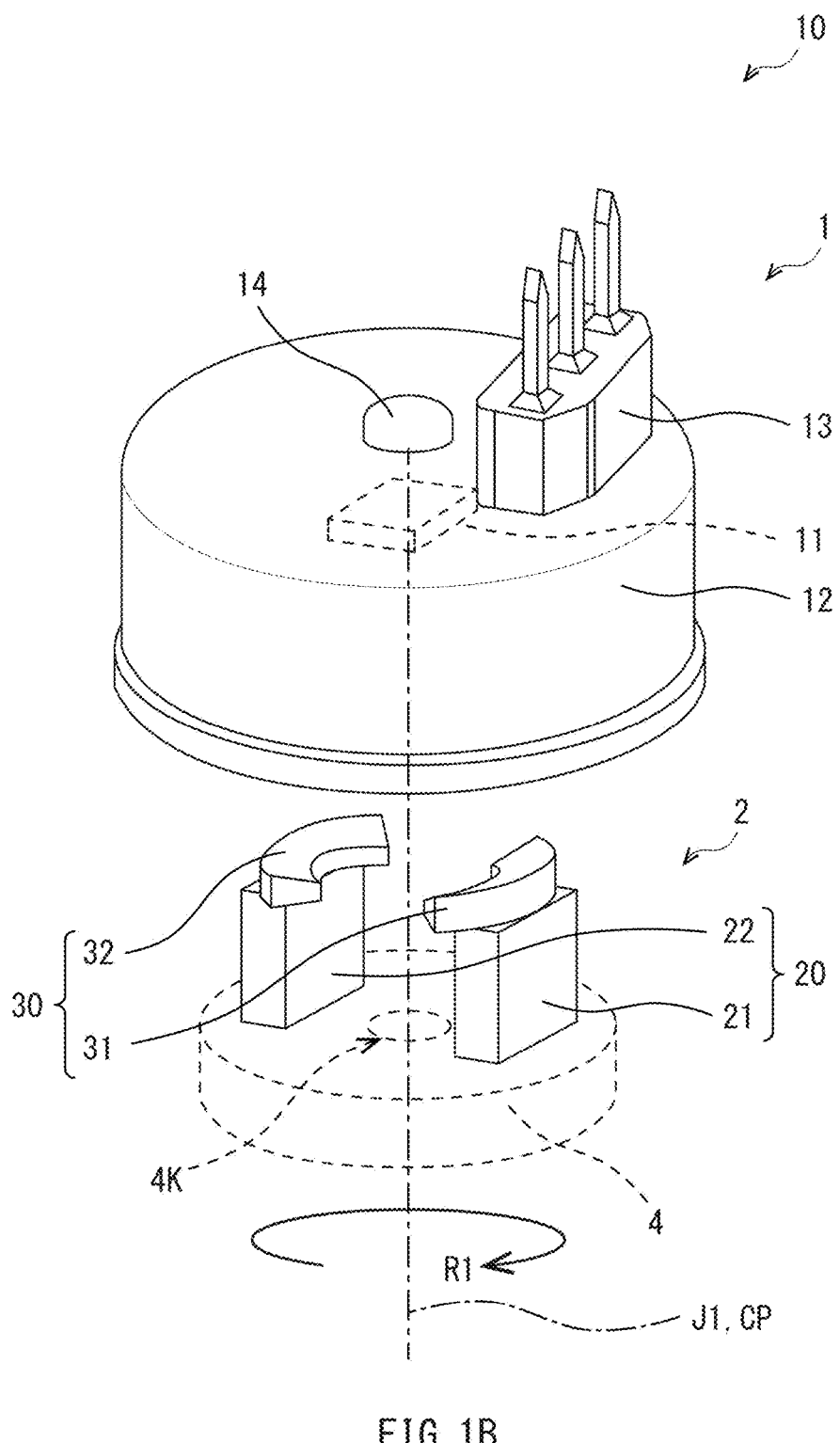
FIG. 1B is an exploded perspective view of an angle detection apparatus illustrated in FIG. 1A.
Figure 2:
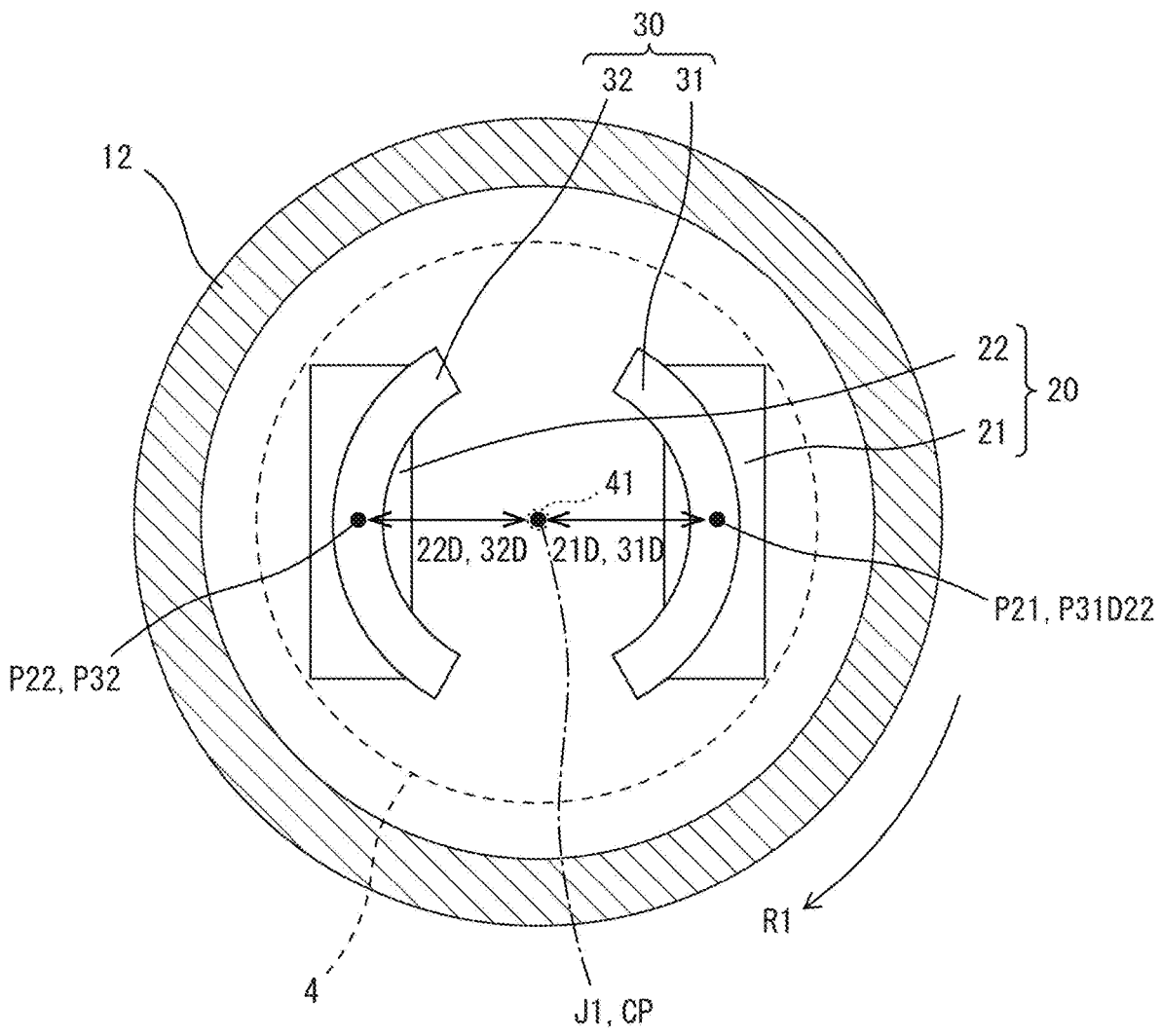
FIG. 2 is a schematic plan view of a magnetic field generation module of the angle detection apparatus illustrated in FIGS. 1A and 1B.
Figure 3:
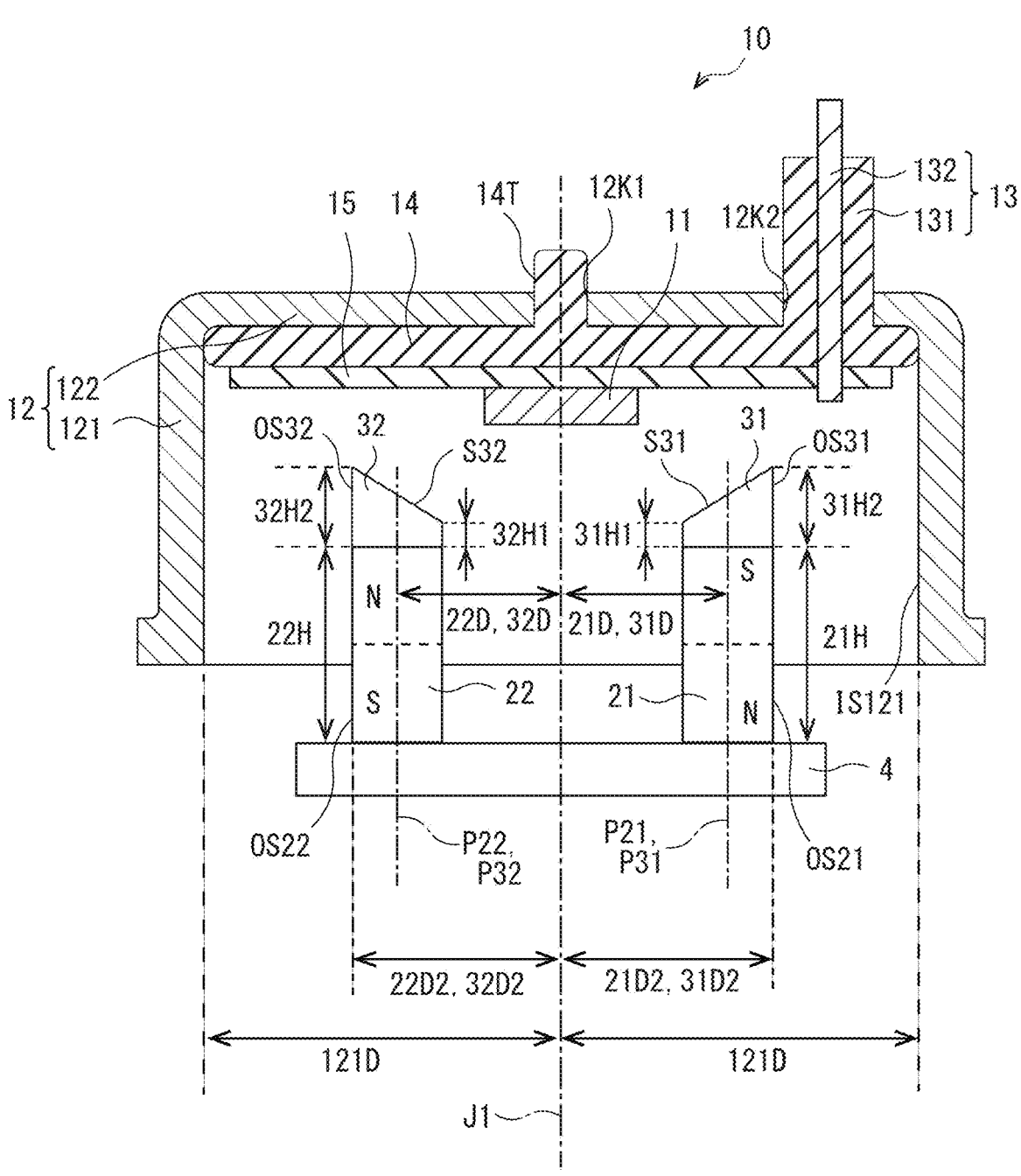
FIG. 3 is a cross-sectional view of the angle detection apparatus illustrated in FIGS. 1A and 1B.

FIG. 1A is a perspective diagram illustrating an overall configuration example of the angle detection system 100. FIG. 1B is an exploded perspective view of an angle detection apparatus 10 (described later) included in the angle detection system 100. FIG. 2 is a schematic plan diagram for describing a mutual positional relationship between components of a magnetic field generation module 2 (described later) in the angle detection system 100 in a plane orthogonal to a rotation axis J1 (described later). It is to be noted that, as used herein, the term "orthogonal" encompasses not only being completely orthogonal, i.e., intersecting at 90°, but also being substantially orthogonal, i.e., intersecting at 90°±about 5°, for example. The schematic plan diagram in FIG. 2 may therefore represent a plane at an angle slightly different from 90° with respect to the rotation axis J1. FIG. 2 illustrates the magnetic field generation module 2 as viewed from a sensor chip 11 (described later) of a sensor module 1 (described later). Note that in FIG. 2, an outline of a magnetic detection element 41 (described later) included in the sensor module 1, a cross section of a magnetic shield 12 (described later), and an outline of a support 4 (described later) supporting the magnetic field generation module 2 are also depicted, each in solid lines or dashed lines. FIG. 3 is a cross-sectional diagram illustrating a cross section of the angle detection apparatus 10 along the rotation axis J1. The support 4 is also illustrated in FIG. 3. The angle detection system 100 may be a system detecting, for example, a rotation angle of a rotary member that rotates, and may be applicable, for example, as a throttle position sensor that detects a throttle valve position in an internal combustion engine to be installed in a vehicle such as an automobile.

As illustrated in FIG. 1A, the angle detection system 100 may include the angle detection apparatus 10, a support 3, and the support 4, for example. The angle detection apparatus 10 may include the sensor module 1 and the magnetic field generation module 2, for example. The sensor module 1 may be supported by the support 3, for example. The magnetic field generation module 2 may be supported by the support 4, for example. The magnetic field generation module 2 may include a magnetic field generation unit 20 and a yoke unit 30, for example. The magnetic field generation unit 20 may include a magnetic field generator that generates a magnetic field to be detected, which is to be detected at the sensor module 1. Hereinafter, the "magnetic field to be detected" will be referred to as a "detection-target magnetic field". The magnetic field generation unit 20 is rotatable relative to the sensor module 1 in a rotation direction R1 around the rotation axis J1, for example. As will be described later, the sensor module 1 includes a magnetic detection element. The magnetic detection element may detect, for example, an intensity and/or direction of the detection-target magnetic field generated by the magnetic field generator. The yoke unit 30 is disposed in a magnetic-field influence region that lies between the magnetic field generation unit 20 and the sensor module 1 in a rotation axis direction and that is to be influenced by the detection-target magnetic field. The yoke unit 30 is rotatable together with the magnetic field generation unit 20.

[Sensor Module 1]

The sensor module 1 may include, for example, the sensor chip 11, the magnetic shield 12, a terminal unit 13, a holder 14, and a circuit board 15. The sensor chip 11 may be disposed on the rotation axis J1, for example. A center position CP of the sensor chip 11 in a plane orthogonal to the rotation axis J1 may coincide with the rotation axis J1. As illustrated in FIG. 2, the sensor chip 11 includes, for example, the magnetic detection element 41 as the foregoing magnetic detection element. The magnetic detection element 41 may detect the intensity of the detection-target magnetic field generated by the magnetic field generator, for example. The magnetic detection element 41 may be an element that is able to detect the intensity of a magnetic field, such as a Hall element. The magnetic detection element 41 may have a sensitive axis along a plane orthogonal to the rotation axis J1, for example. In other words, in a case where the magnetic detection element 41 is a Hall element, the magnetic detection element 41 is able to detect a magnetic field intensity along a plane orthogonal to the rotation axis J1. In one example, the magnetic detection element 41 may be disposed at the center position CP in the plane orthogonal to the rotation axis J1.

As illustrated in FIG. 3, for example, the magnetic shield 12 may include a first shield portion 121 and a second shield portion 122. The first shield portion 121 and the second shield portion 122 may be integral with each other. The magnetic shield 12 may be a structure produced by integrally forming the first shield portion 121 and the second shield portion 122 into one piece. Alternatively, the magnetic shield 12 may be a structure produced by integrating, with an adhesive or the like, the first shield portion 121 and the second shield portion 122 formed individually. Still alternatively, the first shield portion 121 and the second shield portion 122 need not necessarily be integral with each other but only have to be magnetically coupled to each other. The first shield portion 121 and the second shield portion 122 may each include a soft ferromagnetic material, such as permalloy (NiFe).

The first shield portion 121 surrounds the sensor chip 11 along a plane orthogonal to the direction of the rotation axis J1. The first shield portion 121 may have a substantially cylindrical shape, for example. However, the plan shape of each of inner and outer surfaces of the first shield portion 121 is not limited to a circular shape but may be an oval shape or a polygonal shape. Further, the first shield portion 121 may also surround a portion or all of the yoke unit 30 and a portion or all of each of magnets 21 and 22 along the plane orthogonal to the rotation axis direction.

The second shield portion 122 may be provided opposite to the magnetic field generation module 2 with respect to the sensor chip 11. The second shield portion 122 may be a circular-plate-shaped member extending along a plane orthogonal to the rotation axis J1, for example. The holder 14 may be attached to the second shield portion 122. The holder 14 may have a projection 14T. The projection 14T may be press-fittable into an opening 12K1 provided in the second shield portion 122 to thereby allow the holder 14 to be fixed to the second shield portion 122. The terminal unit 13 may be provided to stand on the holder 14 and may extend through an opening 12K2 provided in the second shield portion 122. The terminal unit 13 may include a body 131 and a lead 132, for example. The body 131 may be integral with the holder 14. The circuit board 15 may be attached to a surface of the holder 14 opposite to the second shield portion 122. An end part of the lead 132 may be coupled to the circuit board 15. Further, the sensor chip 11 may be provided on a side of the circuit board 15 opposite to the holder 14. A signal from the sensor chip 11 may be extractable to the outside via the circuit board 15 and the lead 132. Note that the opening 12K2 may be provided in the first shield portion 121, and the terminal unit 13 may be provided to extend through the opening 12K2 in a direction orthogonal to the rotation axis J1. However, providing the opening 12K2 in the second shield portion 122 rather than in the first shield portion 121 allows the magnetic shield 12 to exhibit a higher effect of shielding the sensor chip 11 against a magnetic field.

[Magnetic Field Generation Unit 20]

The magnetic field generation unit 20 may include, for example, the magnets 21 and 22 each serving as the magnetic field generator. The magnets 21 and 22 may each have a shape that basically includes planes only, such as a substantially cube shape or a substantially cuboid shape. The magnets 21 and 22 may be disposed around the rotation axis J1, being spaced apart from each other. For example, a distance between the magnet 21 and the rotation axis J1 and a distance between the magnet 22 and the rotation axis J1 may be equal. Here, the distance between magnet 21 and the rotation axis J1 and the distance between the magnet 22 and the rotation axis J1 respectively refer to, for example, as illustrated in FIG. 2, a distance 21D between a geometric center position P21 of the magnet 21 and the rotation axis J1 and a distance 22D between a geometric center position P22 of the magnet 22 and the rotation axis J1 in a plane orthogonal to the rotation axis J1. The magnetic detection element 41 may be disposed at a position coinciding with the position of the rotation axis J1 in an in-plane direction along the plane orthogonal to the rotation axis J1. The magnets 21 and 22 may be substantially identical in material, shape, and size. The magnets 21 and 22 may be provided at rotationally symmetrical positions with respect to the rotation axis J1 so as to be opposed to each other with the rotation axis J1 therebetween, for example. As illustrated in FIG. 3, the magnets 21 and 22 may both be magnetized in the rotation axis direction. Examples of the material of each of the magnets 21 and 22 may include a neodymium-based magnet material such as NdFeB and a rare-earth magnet material such as SmCo.

[Yoke Unit 30]

The yoke unit 30 may include a yoke 31 and a yoke 32 disposed around the rotation axis J1. The yokes 31 and 32 may be spaced apart from each other, for example. In a cross section orthogonal to the rotation axis J1, for example, the yokes 31 and 32 each have a plan shape that is curved in an arc shape along a direction of rotation around the rotation axis J1, i.e., the rotation direction R1. A central angle of each of the arc-shaped yokes 31 and 32 as viewed from the rotation axis J1 may be determined by, for example, a combination of respective positions of the magnetic detection element 41, the magnet 21, the magnet 22, and the magnetic shield 12.

The yokes 31 and 32 each include a portion that increases in height dimension in the rotation axis direction with increasing distance from the rotation axis J1 along a plane orthogonal to the rotation axis J1. In a specific but non-limiting example, in the yoke 31, a height dimension 31H1 of an inner end face facing the rotation axis J1 may be smallest, and a height dimension 31H2 of an outer end face farther from the rotation axis J1 may be greatest, for example. The yoke 31 may have a top surface S31 that is an inclined surface. The inclined top surface S31 may be inclined with respect to the rotation axis J1 and also inclined with respect to a plane orthogonal to the rotation axis J1.

Note that although FIG. 1B and FIG. 3 illustrate an example case where the top surface S31 of the yoke 31 is an inclined surface, a bottom surface of the yoke 31, i.e., the surface facing the magnet 21 may be an inclined surface. In a case where the surface of the yoke 31 facing the magnet 21 is an inclined surface, a top surface of the magnet 21, i.e., the surface of the magnet 21 facing the yoke 31 may also be an inclined surface extending along the inclined surface of the yoke 31. In either case, the yoke 31 and the magnet 21 may be in close contact with each other to allow no gap to be generated therebetween. Similarly, in the yoke 32, a height dimension 32H1 of an inner end face facing the rotation axis J1 may be smallest, and a height dimension 32H2 of an outer end face farther from the rotation axis J1 may be greatest, for example. The yoke 32 may have a top surface S32 that is an inclined surface. The inclined top surface S32 may be inclined with respect to the rotation axis J1 and also inclined with respect to a plane orthogonal to the rotation axis J1. Note that although FIG. 1B and FIG. 3 illustrate an example case where the top surface S32 of the yoke 32 is an inclined surface, a bottom surface of the yoke 32, i.e., the surface facing the magnet 22 may be an inclined surface. In a case where the surface of the yoke 32 facing the magnet 22 is an inclined surface, a top surface of the magnet 22, i.e., the surface of the magnet 22 facing the yoke 32 may also be an inclined surface extending along the inclined surface of the yoke 32. In either case, the yoke 32 and the magnet 22 may be in close contact with each other to allow no gap to be generated therebetween.

The yoke 31 and the yoke 32 may be provided at rotationally symmetrical positions with respect to the rotation axis J1 so as to be opposed to each other with the rotation axis J1 therebetween, for example. The yokes 31 and 32 may be positioned to overlap the magnets 21 and 22, respectively, in the rotation axis direction, for example. Further, as illustrated in FIG. 3, the yokes 31 and 32 may be in contact with the magnets 21 and 22, respectively. Note that the yokes 31 and 32 may be spaced from the magnets 21 and 22, respectively. In one example, however, the yokes 31 and 32 may be magnetically coupled to the magnets 21 and 22, respectively. Further, for example, a distance between the yoke 31 and the rotation axis J1 and a distance between the yoke 32 and the rotation axis J1 may be equal. Here, the distance between yoke 31 and the rotation axis J1 and the distance between the yoke 32 and the rotation axis J1 respectively refer to, for example, as illustrated in FIG. 2, a distance 31D between a geometric center position P31 of the yoke 31 and the rotation axis J1 and a distance 32D between a geometric center position P32 of the yoke 32 and the rotation axis J1 in a plane orthogonal to the rotation axis J1. The present example embodiment illustrates an example case where, in the magnetic field generation module 2, the center position P31 of the yoke 31 coincides with the center position P21 of the magnet 21, and the center position P32 of the yoke 32 coincides with the center position P22 of the magnet 22, in other words, all the distances 21D, 22D, 31D, and 32D are equal. The magnetic detection element 41 may therefore be positioned on the rotation axis J1 in the in-plane direction along the plane orthogonal to the rotation axis J1. Further, the yokes 31 and 32 may be substantially identical in material, shape, and size. Accordingly, for example, the height dimension 31H1 and the height dimension 32H1 may be substantially equal, and the height dimension 31H2 and the height dimension 32H2 may be substantially equal. Further, an inclination angle of the inclined surface S31 with respect to the rotation axis J1 and an inclination angle of the inclined surface S32 with respect to the rotation axis J1 may be substantially equal. Here, a height dimension 21H of the magnet 21 in the rotation axis direction may be greater than the height dimension 31H2 of the yoke 31 in the rotation axis direction. Likewise, a height dimension 22H of the magnet 22 in the rotation axis direction may be greater than the height dimension 32H2 of the yoke 32 in the rotation axis direction. Examples of the material of each of the yokes 31 and 32 may include a soft magnetic material such as NiFe.

In the angle detection apparatus 10, as described above, the first shield portion 121 may also surround a portion or all of the yoke unit 30 and a portion or all of each of the magnets 21 and 22 along a plane orthogonal to the rotation axis J1. In such a case, in the angle detection apparatus 10, as illustrated in FIG. 3, a distance 121D between an inner surface IS121 of the first shield portion 121 and the rotation axis J1 may be greater than a distance 21D2 between an outer surface OS21 of the magnet 21 and the rotation axis J1. Further, the distance 121D between the inner surface IS121 of the first shield portion 121 and the rotation axis J1 may be greater than a distance 31D2 between an outer surface OS31 of the yoke 31 and the rotation axis J1. Note that FIG. 3 illustrates a configuration example in which the distance 21D2 and the distance 31D2 are equal. Similarly, the distance 121D may be greater than a distance 22D2 between an outer surface OS22 of the magnet 22 and the rotation axis J1. The distance 121D may be greater than a distance 32D2 between an outer surface OS32 of the yoke 32 and the rotation axis J1. In the configuration example illustrated in FIG. 3, the distance 22D2 and the distance 32D2 are equal. Further, as illustrated in FIG. 3, at least a portion of each of the magnets 21 and 22 may be positioned to overlap the first shield portion 121 in an in-plane direction along a plane orthogonal to the direction of the rotation axis J1.

[Support 4]

The support 4 may support the magnets 21 and 22 and may be circular-plate-shaped, for example. The support 4 may have an attachment hole 4K in the middle thereof, for example, and may be attachable to a rotating body via a screw or the like. In a case where the angle detection system 100 is applied as the throttle position sensor described above, the support 4 may be coupled to a rotary shaft of the throttle valve which is, for example, a rotating body, and the support 3 may be fixed to a frame or the like of the internal combustion engine, for example. The yokes 31 and 32 may be fixed to the magnets 21 and 22, respectively. Optionally, the yokes 31 and 32 may be configured to be fixed to the support 4 indirectly, rather than directly. In either case, the magnetic field generation unit 20 and the yoke unit 30 may be rotatable together with the support 4 in the rotation direction R1.

[Operation of Angle Detection System 100]

In the angle detection system 100, upon rotation of the rotating body (e.g., the rotary shaft of the throttle valve) to which the support 4 is attached, the support 4, the magnetic field generation unit 20, and the yoke unit 30 may rotate together in the rotation direction R1. This causes the detection-target magnetic field (magnetic flux) passing through the sensor chip 11 of the sensor module 1 to change direction periodically. As a result, the magnetic detection element 41 in the sensor chip 11 detects a magnetic field (magnetic flux) having an intensity that changes in a sinusoidal manner in accordance with the rotation angle of the magnetic field generation module 2. The rotation angle of the rotating body to which the magnetic field generation module 2 is fixed is therefore determinable from the values of the magnetic field (magnetic flux) detected at the magnetic detection element 41.

[Workings and Effects of Angle Detection System 100]

The angle detection apparatus 10 of the angle detection system 100 according to the example embodiment described above may include the sensor module 1 and the magnetic field generation module 2. The sensor module 1 may include the sensor chip 11 and the magnetic shield 12. The sensor chip 11 includes the magnetic detection element 41. The magnetic shield 12 surrounds the magnetic detection element 41. The magnetic field generation module 2 may include the magnetic field generation unit 20 and the yoke unit 30. The magnetic field generation unit 20 may include the magnets 21 and 22. The yoke unit 30 may include the yokes 31 and 32. The magnets 21 and 22 are configured to generate a magnetic field to be applied to the magnetic detection element 41. The yokes 31 and 32 are disposed between the magnetic detection element 41 and the magnets 21 and 22, respectively, in the rotation axis direction.

Figure 4:
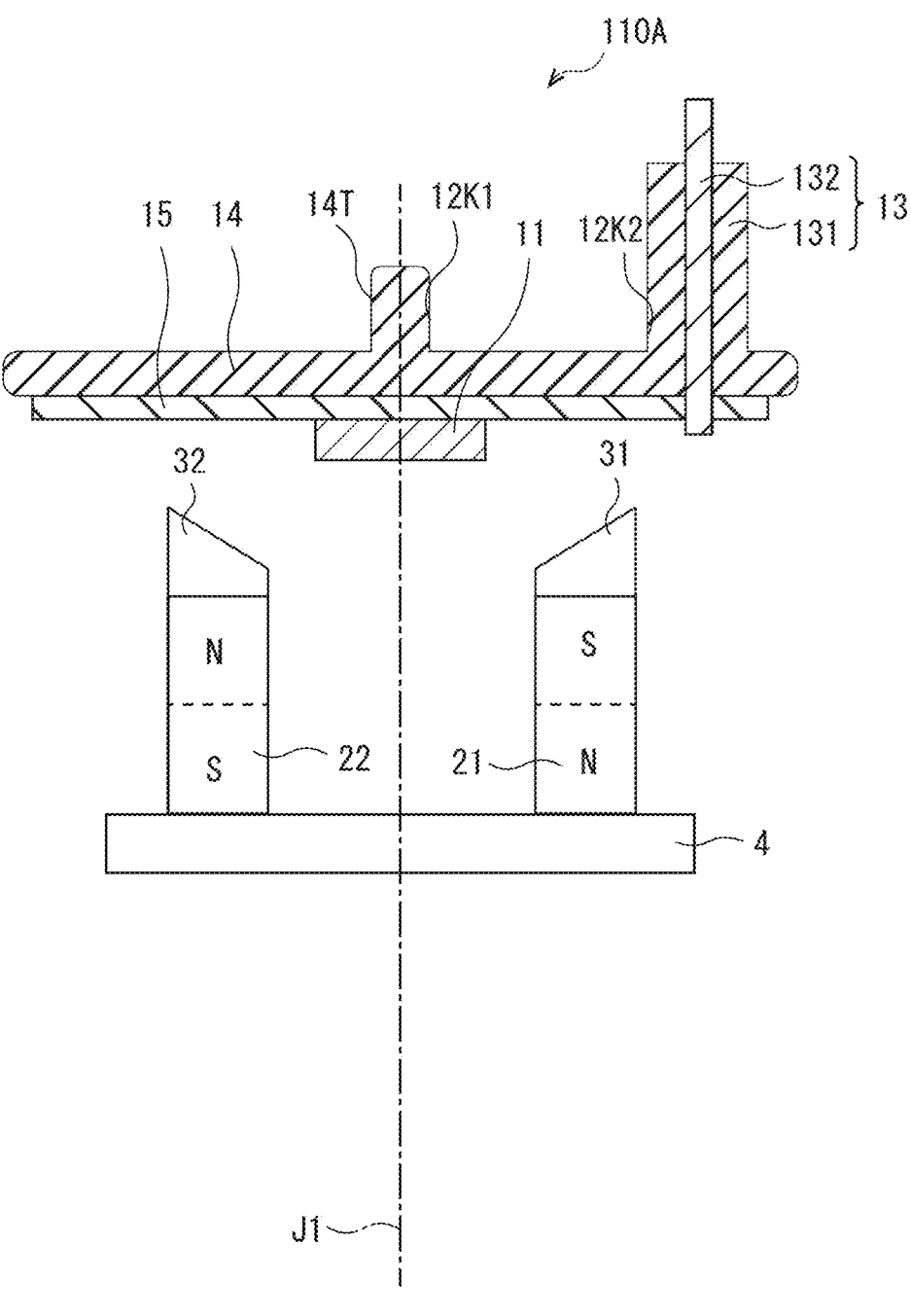
FIG. 4 is a cross-sectional view of an angle detection apparatus according to one reference example.

As described above, the angle detection apparatus 10 includes the magnetic shield 12. Accordingly, even if the magnetic detection element 41 has no magnetic noise canceling function, angle detection accuracy is improved as compared with a case where no component corresponding to the magnetic shield 12 is provided as in an angle detection apparatus 110A according to a first reference example illustrated in FIG. 4, for example. In other words, the angle detection apparatus 10 is able to detect a change in relative angle between the sensor module 1 and the magnetic field generation module 2 with high accuracy. One reason for this is that the magnetic shield 12 blocks an unwanted disturbance magnetic field other than the magnetic field generated by the magnetic field generation unit 20, and thereby reduces the disturbance magnetic field to be exerted on the magnetic detection element 41. In the angle detection apparatus 10 according to the present example embodiment, in one example, the magnetic shield 12 may have a structure in which the first shield portion 121 and the second shield portion 122 are coupled to each other. This makes it possible to block a disturbance magnetic field along the in-plane direction orthogonal to the rotation axis J1 by means of the first shield portion 121 and to block a disturbance magnetic field in the rotation axis direction along the rotation axis J1 by means of the second shield portion 122. Accordingly, it is possible to significantly reduce the intensity of the disturbance magnetic field to be exerted on the magnetic detection element 41. The magnetic shield 12 may have an opening on a side opposite to the second shield portion 122 with respect to the sensor chip 11, and the magnets 21 and 22 that generate the magnetic field to be applied to the magnetic detection element 41 may be provided in the opening. This makes it possible to sufficiently reduce the influence of the disturbance magnetic field that enters from the opening of the magnetic shield 12 to reach the sensor chip 11. FIG. 4 is a cross-sectional view of the angle detection apparatus 110A according to the first reference example, and corresponds to FIG. 3 which is a cross-sectional view of the angle detection apparatus 10 according to the present example embodiment. Note that the magnetic shield 12 may be omitted in a case where any other measures are taken to reduce the influence of the disturbance magnetic field, such as a case where the magnetic detection element 41 is provided with a magnetic noise canceling function.

Figure 5:
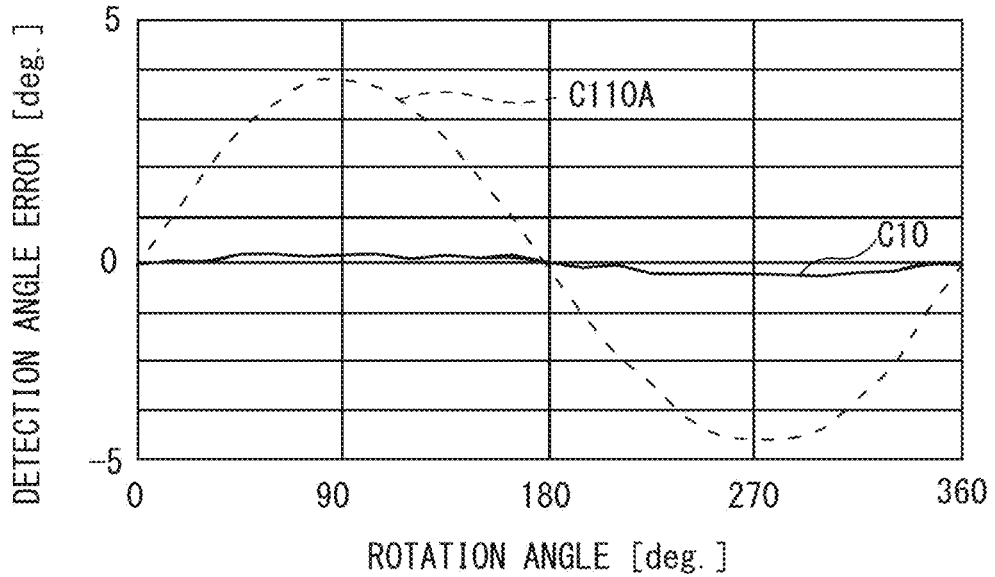
FIG. 5 is a characteristic diagram comparing detection angle errors between the angle detection apparatus according to the example embodiment of the technology illustrated in FIG. 1A and the angle detection apparatus illustrated in FIG. 4.

FIG. 5 illustrates an example of results of comparing detection angle errors between the angle detection apparatus 10 according to the present example embodiment and the angle detection apparatus 110A (FIG. 4) according to the first reference example when angle detection was performed under application of a disturbance magnetic field of 3000 A/m into a plane orthogonal to the rotation axis J1. In FIG. 5, the horizontal axis represents a rotation angle [deg.] of the magnetic field generation module 2 with respect to the sensor chip 11, and the vertical axis represents an error [deg.] of the angle detected by the sensor chip 11. A curve C10 represents the angle error of the angle detection apparatus 10 according to the present example embodiment, and a curve C110A represents the angle error of the angle detection apparatus 110A according to the first reference example. As illustrated in FIG. 5, while an angle error of about ±4 [deg.] occurred with the angle detection apparatus 110A according to the first reference example, the angle detection apparatus 10 according to the present example embodiment was able to reduce the angle error to within a range of ±0.5 [deg.]. Therefore, providing the magnetic shield 12 is highly effective in reducing the detection angle error caused by the disturbance magnetic field.

Figures 6A, 6B:
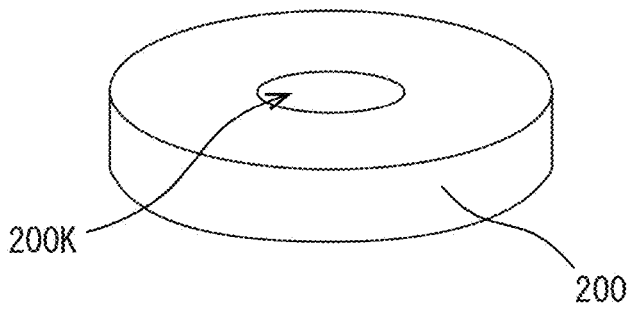
FIG. 6A is an explanatory diagram illustrating an example of a magnetic flux density distribution in an angle detection apparatus according to one reference example.
FIG. 6B is a perspective diagram illustrating a configuration example of an annular magnet for use in the angle detection apparatus of FIG. 6A.

Furthermore, in the angle detection apparatus 10, the magnets 21 and 22 are magnetized along the direction of the rotation axis J1. This makes it easier to avoid absorption of a magnetic flux of the magnetic field generated by the magnets 21 and 22 into the magnetic shield 12 (e.g., into the first shield portion 121 of the magnetic shield 12), as compared with a case where the magnets 21 and 22 are magnetized along an in-plane direction orthogonal to the rotation axis J1, for example. For example, an angle detection apparatus 110B according to a second reference example illustrated in FIG. 6A includes an annular magnet 200 magnetized along an in-plane direction orthogonal to the rotation axis J1, in place of the magnets 21 and 22. Note that the annular magnet 200 has the same composition as that of the magnets 21 and 22 and has a volume equal to the total volume of the magnets 21 and 22. FIG. 6A schematically illustrates a magnetic flux density distribution in the angle detection apparatus 110B according to the second reference example. FIG. 6B illustrates a configuration example of the annular magnet in the angle detection apparatus of FIG. 6A in an enlarged manner. The annular magnet 200 has an opening 200K in the middle thereof. In the angle detection apparatus 110B of FIG. 6A, it is easier for a magnetic flux of a magnetic field generated by the annular magnet 200 to be absorbed in part by the magnetic shield 12. In FIG. 6A, a region of level 1 enclosed by a curve Lv1 represents a region highest in magnetic flux density. The illustration in FIG. 6A represents that the magnetic flux density gradually decreases in the order of a region of level 2 enclosed by a curve Lv2, a region of level 3 enclosed by a curve Lv3, and a region of level 4 enclosed by a curve Lv4. As illustrated in FIG. 6A, in the angle detection apparatus 110B according to the second reference example, almost all of the magnetic shield 12 was the region of level 1. Further, it is seen that in the angle detection apparatus 110B, the magnetic flux density of the magnetic field exerting on the sensor chip 11 was lower than level 4.

Figure 6C:
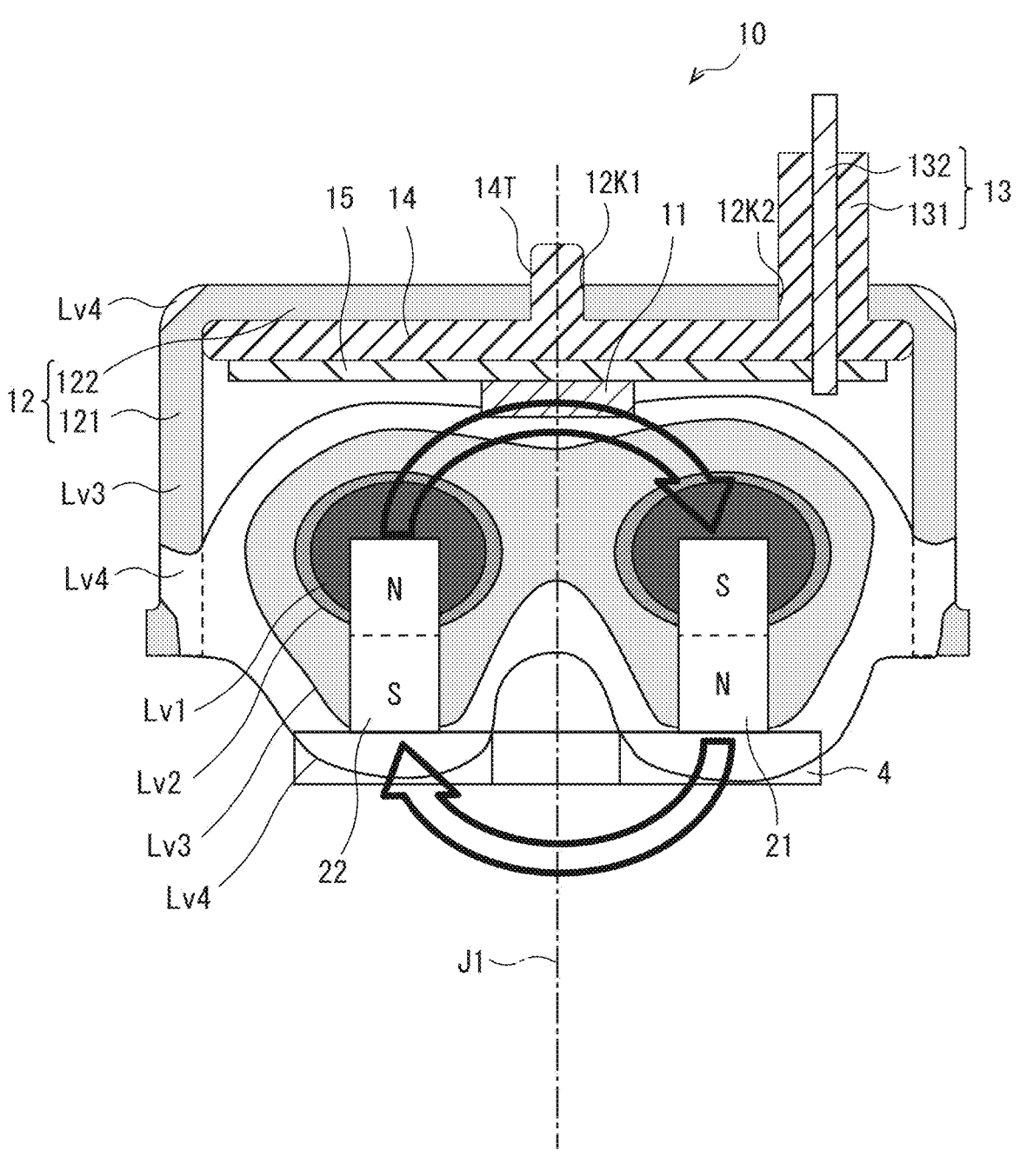
FIG. 6C is an explanatory diagram illustrating an example of a magnetic flux density distribution in the angle detection apparatus according to the example embodiment of the technology illustrated in FIG. 1A.

In contrast, FIG. 6C schematically illustrates a magnetic flux density distribution in the angle detection apparatus 10 according to the present example embodiment. As illustrated in FIG. 6C, in the angle detection apparatus 10 according to the present example embodiment, the magnetic shield 12 was the region of level 3 or level 4. It is thus seen that the magnetizing of the magnets 21 and 22 along the direction of the rotation axis J1 resulted in a reduction of a component, of the magnetic field generated by the magnets 21 and 22, to be absorbed by the magnetic shield 12. Further, it is seen that in the angle detection apparatus 10, the magnetic flux density of the magnetic field exerting on the sensor chip 11 was at level 4. This indicates that the angle detection apparatus 10 according to the present example embodiment makes it possible for the magnetic field generated by the magnets 21 and 22 to be effectively applied to the magnetic detection element 41. By way of example, regarding the angle detection apparatus 110B according to the second reference example and the angle detection apparatus 10 according to the present example embodiment, as a result of performing calculations on the assumption that magnetic flux densities of the same magnitude were to be applied to the respective sensor chips 11 with the magnets 21 and 22 of the same material disposed at the same distance from the sensor chips 11, it was found that the volume of the magnets 21 and 22 in the angle detection apparatus 110B had to be approximately 2.84 times higher than that in the angle detection apparatus 10. In the angle detection apparatus 10 according to the present example embodiment, the provision of the magnetic shield 12 resulted in an approximately 20% decrease in the magnetic flux density, whereas in the angle detection apparatus 110B according to the second reference example, the provision of the magnetic shield 12 resulted in an approximately 62% decrease in the magnetic flux density.

From the foregoing, it can be said that the angle detection apparatus 10 according to the present example embodiment makes it possible to reduce the influence of the disturbance magnetic field while suppressing a decrease in effective magnetic flux density at a position where the magnetic detection element 41 that detects the magnetic field generated by the magnets 21 and 22 is disposed. Furthermore, because the magnets 21 and 22 are magnetized in the rotation axis direction, it is possible to apply a magnetic field of higher magnetic flux density to the magnetic detection element 41 than in a case where the magnets 21 and 22 are magnetized in an in-plane direction orthogonal to the rotation axis J1, for example.

Further, the angle detection apparatus 10 according to the present example embodiment is provided with the yokes 31 and 32 that are rotatable together with the magnets 21 and 22. Accordingly, angle detection accuracy is improved as compared with a case without the yokes, for example.

Further, in the angle detection apparatus 10 according to the present example embodiment, the yokes 31 and 32 each have a plan shape that is curved in an arc shape along the circumferential direction of a circle centered around the rotation axis J1 in a plane orthogonal to the rotation axis J1. In addition, the yokes 31 and 32 each include a portion that increases in height dimension along the rotation axis J1 with increasing distance from the rotation axis J1 along the plane orthogonal to the rotation axis J1. Accordingly, even in a case where, for example, there occurs a displacement of a relative position between the sensor chip 11 including the magnetic detection element 41 and a combination of the magnets 21 and 22 and the yokes 31 and 32, the displacement has a less influence on the detection angle error of the magnetic detection element 41. One reason for this is that in the angle detection apparatus 10 according to the present example embodiment, a spatial region with a uniform magnetic flux density extends widely in the vicinity of the rotation axis J1, as compared with a case where the yokes do not have a plan shape that is curved in an arc shape along the circumferential direction of a circle centered around the rotation axis J1 or a case where the yokes each include no portion that increases in height dimension along the rotation axis J1 with increasing distance from the rotation axis J1 along a plane orthogonal to the rotation axis J1.

Further, the yokes 31 and 32 may be positioned to overlap the magnets 21 and 22, respectively, in the rotation axis direction, as in the angle detection apparatus 10 according to the present example embodiment. This improves the yokes 31 and 32 in their effect of concentrating magnetic flux, and accordingly, reduces unevenness in intensity distribution, i.e., distribution of magnetic flux densities, of the detection-target magnetic field in a region near the sensor chip 11, as compared with a case where the yokes 31 and 32 are positioned not to overlap the magnets 21 and 22, respectively, in the rotation axis direction. As a result, the angle detection accuracy is further improved.

Further, the yokes 31 and 32 may be in contact with the magnets 21 and 22, respectively, in the rotation axis direction, as in the angle detection apparatus 10 according to the present example embodiment. This improves the yokes 31 and 32 in their effect of concentrating magnetic flux, and accordingly reduces unevenness in intensity distribution, i.e., distribution of magnetic flux densities, of the detection-target magnetic field in a region near the sensor chip 11, as compared with a case where the yokes 31 and 32 are spaced apart from the magnets 21 and 22, respectively. As a result, the angle detection accuracy is further improved.

Further, the height dimensions 21H and 22H of the magnets 21 and 22 in the rotation axis direction may be greater than the height dimensions 31H2 and 32H2 of the yokes 31 and 32 in the rotation axis direction, respectively, as in the angle detection apparatus 10 according to the present example embodiment. This makes it possible keep good balance between the volume of the magnets 21 and 22 and the volume of the yokes 31 and 32. This helps to reduce a dimension, such as a dimension in the rotation axis direction, of the entire apparatus while effectively supplying the sensor chip 11 with the detection-target magnetic field having a higher intensity.

Further, in a case where the magnets 21 and 22 are magnetized in the rotation axis direction as in the angle detection apparatus 10 according to the present example embodiment, it is possible to effectively apply the detection-target magnetic field along the rotation axis direction to the magnetic detection element 41 having a sensitive axis along the rotation axis direction.

Further, both the magnets 21 and 22 may have a substantially cube shape or a substantially cuboid shape, as in the angle detection apparatus 10 according to the present example embodiment. Accordingly, the magnets 21 and 22 are superior in processability at the time of their fabrication, thus being advantageous in terms of, for example, mass production, as compared with a magnet having an arc shape, for example.

Further, the magnetic field generation unit 20 may include the two magnets 21 and 22 that are spaced apart from each other around the rotation axis J1, as in the angle detection apparatus 10 according to the present example embodiment. This allows the magnets 21 and 22 to be smaller in total volume without degradation in angle detection accuracy as compared with a case where the magnetic field generation unit 20 includes only a single magnet. It is thus possible to achieve a lighter weight.

Further, the magnets 21 and 22 may be substantially identical in material, shape, and size, as in the angle detection apparatus 10 according to the present example embodiment. This makes it possible to achieve further improved angle detection accuracy as compared with a case where the magnets 21 and 22 are different from each other in material, shape, or size. Further, the distance 21D and the distance 22D may be equal. This makes it possible to achieve further improved angle detection accuracy as compared with a case where the distances 21D and 22D are different. One reason for this is that making the distances 21D and 22D equal reduces unevenness, related to the rotation angle of the magnetic field generation module 2, of the detection-target magnetic field to be applied to the sensor module 1.

Further, as in the angle detection apparatus 10 according to the present example embodiment, the yokes 31 and 32 may each have a plan shape that is curved in an arc shape along the rotation direction R1 in a plane orthogonal to the rotation axis J1. This makes it possible to achieve further improved angle detection accuracy as compared with a case where the yokes 31 and 32 each have a linearly extending plan shape, for example. One reason for this is that making the yokes 31 and 32 curved in plan shape reduces unevenness, related to the rotation angle of the magnetic field generation module 2, of the detection-target magnetic field to be applied to the sensor module 1.

Further, the yoke unit 30 may include the two yokes 31 and 32 that are spaced apart from each other around the rotation axis J1. This makes it possible to achieve a lighter weight as compared with a case where the yokes 31 and 32 are joined to each other into a single annular shape.

Further, the yokes 31 and 32 may be provided at rotationally symmetrical positions with respect to the rotation axis J1. This makes it possible to achieve further improved angle detection accuracy as compared with a case where the yokes 31 and 32 are not provided at rotationally symmetrical positions. Further, the distance 31D and the distance 32D may be equal. This makes it possible to achieve further improved angle detection accuracy as compared with a case where the distances 31D and 32D are different. One reason for the above is that providing the yokes 31 and 32 at rotationally symmetrical positions and making the distances 31D and 32D equal each reduce unevenness, related to the rotation angle of the magnetic field generation module 2, of the detection-target magnetic field to be applied to the sensor module 1.

2. EXPERIMENT EXAMPLES

The angle detection apparatus 10 according to the foregoing example embodiment illustrated in FIG. 1 was examined for a relationship between the shape of the yokes 31 and 32 and the detection angle error.

Experiment Example 1-1

The angle detection apparatus 10 according to the foregoing example embodiment was examined for detection angle error occurring when the center position CP of the magnetic detection element 41 in a plane orthogonal to the rotation axis J1 was displaced in a range of 0 mm to 1.0 mm from the position of the rotation axis J1. The result is represented by a curve C1-1 in FIG. 7. Here, a simulation was performed to determine an error of the rotation angle of the magnetic field generation module 2 to be detected by the sensor module 1 in a case where the magnetic field generation module 2 was operated to rotate under application of no external magnetic field other than the magnetic field generated by the magnets 21 and 22. The magnets 21 and 22 were neodymium magnets, i.e., rare earth magnets containing neodymium, iron, and boron as main constituent elements. The magnets 21 and 22 each had dimensions of 6.0 mm×2.5 mm×5.0 mm. The distances 21D and 22D were each 4.75 mm. The material of the arc-shaped yokes 31 and 32 was SPCC (common steel). The yokes 31 and 32 each had a central angle of 90°. The height dimensions 31H1 and 32H1 of the yokes 31 and 32 were each 0.5 mm. The height dimensions 31H2 and 32H2 of the yokes 31 and 32 were each 2.5 mm. The yokes 31 and 32 were 1 mm apart from the magnetic detection element 41 in the rotation axis direction.

Experiment Example 1-2

Figure 7:
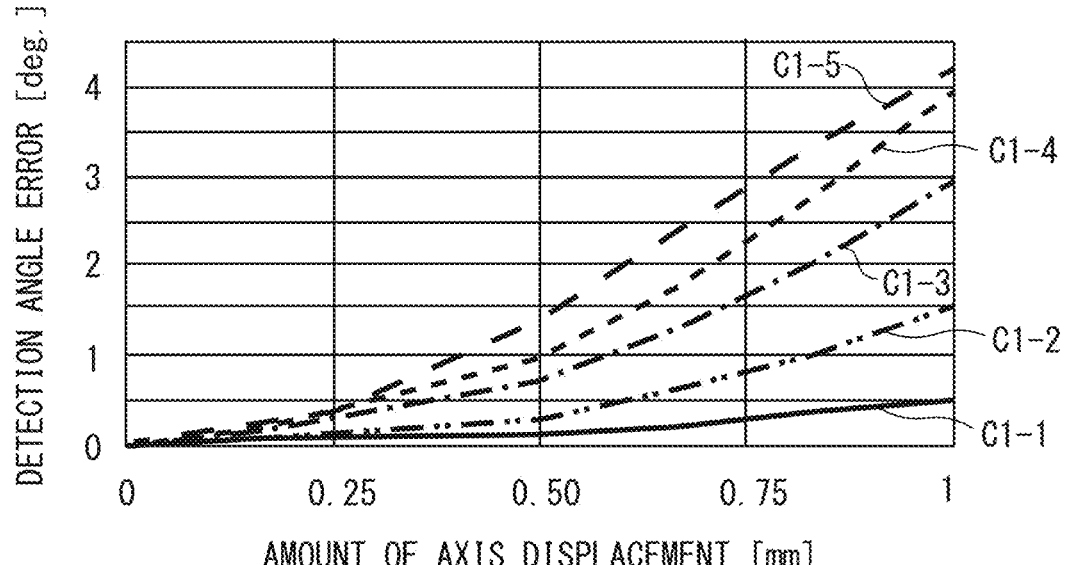
FIG. 7 is a characteristic diagram illustrating a detection angle error resulting from a positional displacement between a magnetic detection element and a rotation axis in each of angle detection apparatuses of Experiment Examples 1-1 to 1-5.
Figure 8A:
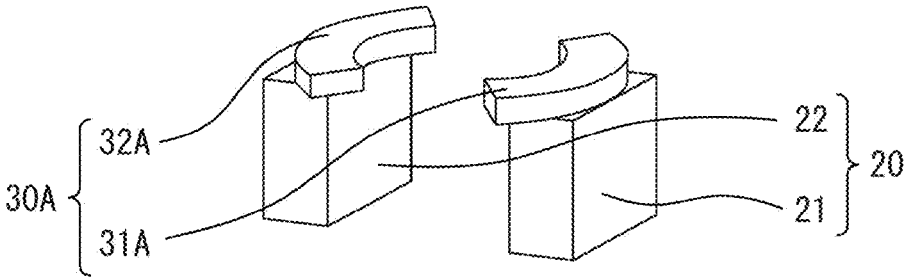
FIG. 8A is a perspective diagram schematically illustrating the appearance of yokes in the angle detection apparatus of Experiment Example 1-2.

An error of the rotation angle was determined by simulation in a manner similar to that in Experiment Example 1-1 except that a yoke unit 30A including yokes 31A and 32A illustrated in FIG. 8A was used instead of the yoke unit 30 including the yokes 31 and 32. The result is represented by a curve C1-2 in FIG. 7. The yokes 31A and 32A were soft ferromagnetic bodies each having a substantially constant height dimension in the rotation axis direction while having a plan shape forming a portion of an annular member. The yokes 31A and 32A were the same as the yokes 31 and 32 in composition and volume.

Experiment Example 1-3

Figure 8B:
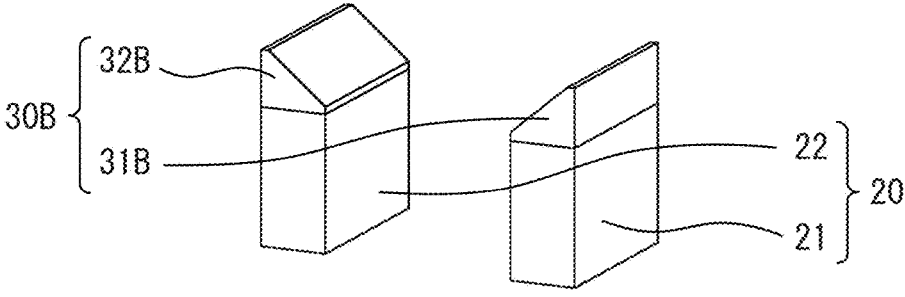
FIG. 8B is a perspective diagram schematically illustrating the appearance of yokes in the angle detection apparatus of Experiment Example 1-3.

An error of the rotation angle was determined by simulation in a manner similar to that in Experiment Example 1-1 except that a yoke unit 30B including yokes 31B and 32B illustrated in FIG. 8B was used instead of the yoke unit 30 including the yokes 31 and 32. The result is represented by a curve C1-3 in FIG. 7. The yokes 31B and 32B were substantially triangular-prism-shaped soft ferromagnetic bodies extending linearly in an in-plane direction orthogonal to the rotation axis J1 without being curved, while having inclined surfaces S31B and S32B. The yokes 31B and 32B were the same as the yokes 31 and 32 in composition and volume.

Experiment Example 1-4

An error of the rotation angle was determined by simulation in a manner similar to that in Experiment Example 1-1 except that the yokes 31 and 32 were omitted. The result is represented by a curve C1-4 in FIG. 7.

Experiment Example 1-5

An error of the rotation angle was determined by simulation in a manner similar to that in Experiment Example 1-1 except that the annular magnet 200 magnetized in an in-plane direction orthogonal to the rotation axis J1 as illustrated in FIG. 6A was used and the yokes 31 and 32 were omitted. The result is represented by a curve C1-5 in FIG. 7.

As illustrated in FIG. 7, it was confirmed that in all the experiment examples, the detection angle error increased with increasing amount of axis displacement [mm] of the center position CP with respect to the position of the rotation axis J1. However, for Experiment Example 1-1 corresponding to the angle detection apparatus 10 according to the present example embodiment, it was confirmed that the detection angle error was sufficiently reduced as compared with the other Experiment Examples 1-2 to 1-5.

Experiment Example 2-1

Figure 9A:
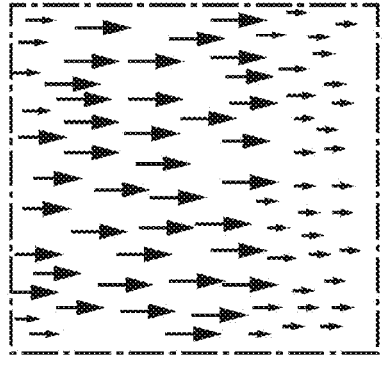
FIG. 9A is a contour diagram schematically illustrating a magnetic flux density distribution of a magnetic field component in a direction in which two magnets are opposed to each other in an angle detection apparatus of Experiment Example 2-1.
Figure 9B:
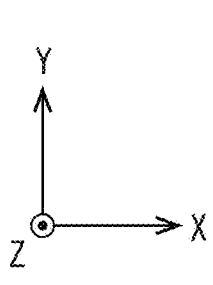
FIG. 9B is an explanatory diagram schematically illustrating vectors of the magnetic flux density distribution in a plane orthogonal to the rotation axis in the angle detection apparatus of Experiment Example 2-1.

Next, a simulation was performed on the angle detection apparatus 10 of FIG. 3 described in the foregoing example embodiment to determine a magnetic flux density distribution of a magnetic field component in a horizontal direction in the paper plane of FIG. 3, that is, in the direction in which the magnets 21 and 22 are opposed to each other, of the magnetic field generated by the magnets 21 and 22. Note that the magnetic detection element 41 is configured to detect the intensity of the magnetic field in the direction in which the magnets 21 and 22 are opposed to each other. FIG. 9A is a contour diagram schematically illustrating the magnetic flux density distribution of the magnetic field component in the direction in which the magnets 21 and 22 are opposed to each other in the angle detection apparatus 10 of Experiment Example 2-1. Note that FIG. 9A illustrates the magnetic flux density distribution in a spatial region between a combination of the magnet 21 and the yoke 31 and a combination of the magnet 22 and the yoke 32, and omits the illustration of the magnetic flux density distributions in the other spatial regions. FIG. 9B is an explanatory diagram schematically illustrating vectors of the magnetic flux density in the vicinity of the sensor chip 11 along a plane orthogonal to the rotation axis J1 in the angle detection apparatus 10 of Experiment Example 2-1. In FIGS. 9A and 9B, the direction in which the combination of the magnet 21 and the yoke 31 and the combination of the magnet 22 and the yoke 32 are opposed to each other is an X-axis direction, the direction of the rotation axis J1 is a Z-axis direction, and a direction orthogonal to the X-axis direction and the Z-axis direction is a Y-axis direction.

Experiment Example 2-2

Figures 10A, 10B:
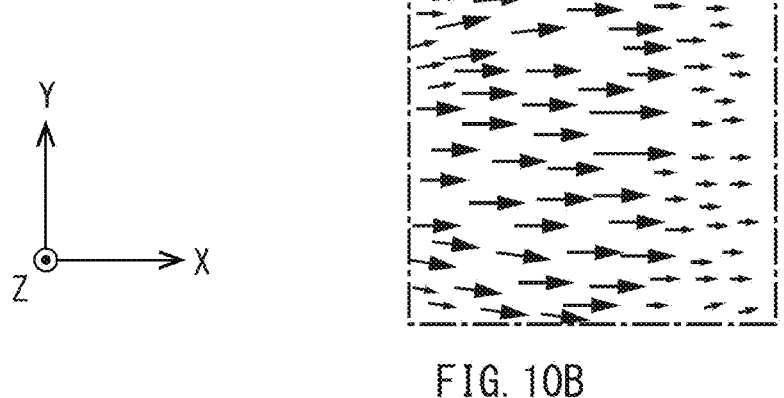
FIG. 10A is a contour diagram schematically illustrating a magnetic flux density distribution of the magnetic field component in the direction in which two magnets are opposed to each other in an angle detection apparatus of Experiment Example 2-2.
FIG. 10B is an explanatory diagram schematically illustrating vectors of the magnetic flux density distribution in a plane orthogonal to the rotation axis in the angle detection apparatus of Experiment Example 2-2.

Next, an angle detection apparatus 10A having substantially the same configuration as that of the angle detection apparatus 10 illustrated in, e.g., FIG. 3 except for including the yoke unit 30A illustrated in FIG. 8A instead of the yoke unit 30 was subjected to a similar evaluation under similar conditions to those in Experiment Example 2-1 described above. FIG. 10A is a contour diagram schematically illustrating the magnetic flux density distribution of the magnetic field component in the direction in which the magnets 21 and 22 are opposed to each other in the angle detection apparatus 10A of Experiment Example 2-2. Note that FIG. 10A illustrates the magnetic flux density distribution in a spatial region between a combination of the magnet 21 and the yoke 31A and a combination of the magnet 22 and the yoke 32A, and omits the illustration of the magnetic flux density distributions in the other spatial regions. FIG. 10B is an explanatory diagram schematically illustrating vectors of the magnetic flux density in the vicinity of the sensor chip 11 along a plane orthogonal to the rotation axis J1 in the angle detection apparatus 10A of Experiment Example 2-2. In FIGS. 10A and 10B, the direction in which the combination of the magnet 21 and the yoke 31A and the combination of the magnet 22 and the yoke 32A are opposed to each other is the X-axis direction, the direction of the rotation axis J1 is the Z-axis direction, and a direction orthogonal to the X-axis direction and the Z-axis direction is the Y-axis direction.

Experiment Example 2-3

Figures 11A, 11B:
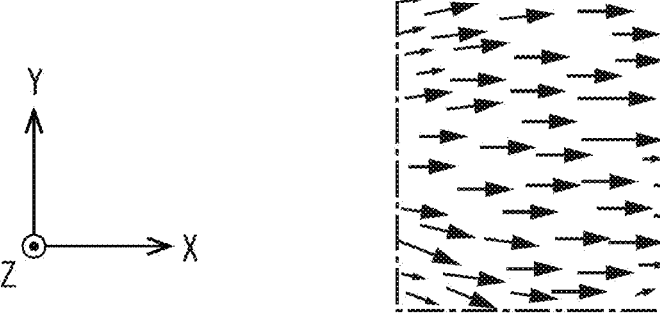
FIG. 11A is a contour diagram schematically illustrating a magnetic flux density distribution of the magnetic field component in the direction in which two magnets are opposed to each other in an angle detection apparatus of Experiment Example 2-3.
FIG. 11B is an explanatory diagram schematically illustrating vectors of the magnetic flux density distribution in a plane orthogonal to the rotation axis in the angle detection apparatus of Experiment Example 2-3.

Next, an angle detection apparatus 10B having substantially the same configuration as that of the angle detection apparatus 10 illustrated in, e.g., FIG. 3 except for including the yoke unit 30B illustrated in FIG. 8B instead of the yoke unit 30 was subjected to a similar evaluation under similar conditions to those in Experiment Example 2-1 described above. FIG. 11A is a contour diagram schematically illustrating the magnetic flux density distribution of the magnetic field component in the direction in which the magnets 21 and 22 are opposed to each other in the angle detection apparatus 10B of Experiment Example 2-3. Note that FIG. 11A illustrates the magnetic flux density distribution in a spatial region between a combination of the magnet 21 and the yoke 31B and a combination of the magnet 22 and the yoke 32B, and omits the illustration of the magnetic flux density distributions in the other spatial regions. FIG. 11B is an explanatory diagram schematically illustrating vectors of magnetic flux density in the vicinity of the sensor chip 11 along a plane orthogonal to the rotation axis J1 in the angle detection apparatus 10B of Experiment Example 2-3. In FIGS. 11A and 11B, the direction in which the combination of the magnet 21 and the yoke 31B and the combination of the magnet 22 and the yoke 32B are opposed to each other is the X-axis direction, the direction of the rotation axis J1 is the Z-axis direction, and a direction orthogonal to the X-axis direction and the Z-axis direction is the Y-axis direction.

Experiment Example 2-4

Next, an angle detection apparatus 10C having substantially the same configuration as that of the angle detection apparatus 10 illustrated in, e.g., FIG. 3 except for including no yokes 31 and 32 was subjected to a similar evaluation under similar conditions to those in Experiment Example 2-1 described above. FIG. 12A is a contour diagram schematically illustrating the magnetic flux density distribution of the magnetic field component in the direction in which the magnets 21 and 22 are opposed to each other in the angle detection apparatus 10C of Experiment Example 2-4. Note that FIG. 12A illustrates the magnetic flux density distribution in a spatial region between the magnets 21 and 22, and omits the illustration of the magnetic flux density distributions in the other spatial regions. FIG. 12B is an explanatory diagram schematically illustrating vectors of the magnetic flux density in the vicinity of the sensor chip 11 along a plane orthogonal to the rotation axis J1 in the angle detection apparatus 10C of Experiment Example 2-4. In FIGS. 12A and 12B, the direction in which the magnets 21 and 22 are opposed to each other is the X-axis direction, the direction of the rotation axis J1 is the Z-axis direction, and a direction orthogonal to the X-axis direction and the Z-axis direction is the Y-axis direction.

Experiment Example 2-5

Figure 13A:
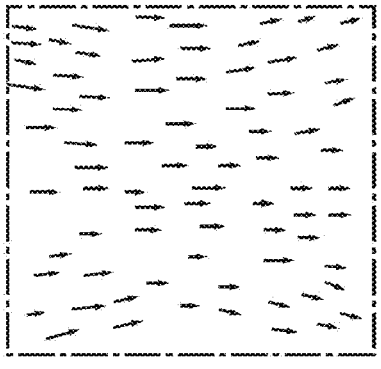
FIG. 13A is a contour diagram schematically illustrating a magnetic flux density distribution of a magnetic field component from an annular magnet in an angle detection apparatus of Experiment Example 2-5.
Figure 13B:
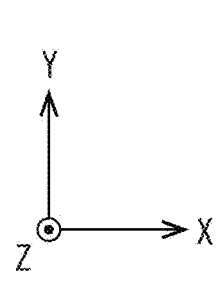
FIG. 13B is an explanatory diagram schematically illustrating vectors of the magnetic flux density distribution in a plane orthogonal to the rotation axis in the angle detection apparatus of Experiment Example 2-5.

Next, an angle detection apparatus 110B having substantially the same configuration as that of the angle detection apparatus 10 illustrated in, e.g., FIG. 3 except for including the annular magnet 200 illustrated in FIG. 6B instead of the magnets 21 and 22 and including no yokes 31 and 32 was subjected to a similar evaluation under similar conditions to those in Experiment Example 2-1 described above. FIG. 13A is a contour diagram schematically illustrating the magnetic flux density distribution of the magnetic field component in a radial direction of the annular magnet 200 in the angle detection apparatus 110B of Experiment Example 2-5. Note that FIG. 13A illustrates the magnetic flux density distribution in a spatial region near the opening 200K of the annular magnet 200, and omits the illustration of the magnetic flux density distributions in the other spatial regions. FIG. 13B is an explanatory diagram schematically illustrating vectors of the magnetic flux density in the vicinity of the sensor chip 11 along a plane orthogonal to the rotation axis J1 in the angle detection apparatus 110B of Experiment Example 2-5. In FIGS. 13A and 13B, the radial direction of the annular magnet 200 is the X-axis direction, the direction of the rotation axis J1 is the Z-axis direction, and a direction orthogonal to the X-axis direction and the Z-axis direction is the Y-axis direction.

As illustrated in FIGS. 9A to 13B, it was confirmed that in Experiment Example 2-1 (FIGS. 9A and 9B), the magnetic field component in the direction in which the magnets 21 and 22 are opposed to each other exhibited a substantially uniform magnetic flux density over a larger region in the vicinity of the sensor chip 11 than in the other Experiment Examples 2-2 to 2-5. From comparisons between FIG. 9B and FIGS. 10B, 11B, 12B, and 13B, it was found that the orientations of the vectors of the magnetic flux density in the vicinity of the sensor chip 11 were aligned in the X-axis direction in Experiment Example 2-1 (FIG. 9B) in contrast to the other Experiment Examples 2-2 to 2-5. This indicates that with Experiment Example 2-1 (FIG. 9B), it is possible to keep an error of the angle detected at the sensor chip 11 low even if the center position CP of the sensor chip 11 is somewhat displaced with respect to the position of the magnets 21 and 22 and the position of the yokes 31 and 32, as compared with the other Experiment Examples 2-2 to 2-5.

Further, in Experiment Example 2-1 (FIG. 9A), the sensor chip 11 was included in a region enclosed by the curve Lv4. It was therefore confirmed that the magnetic field generated by the magnets 21 and 22 was effectively applied to the sensor chip 11 as compared with the other Experiment Examples 2-2 to 2-5 (FIGS. 10B, 11B, 12B, and 13B). Note that in FIGS. 9A, 10A, 11A, 12A, and 13A, the region of level 1 enclosed by the curve Lv1 is highest in magnetic flux density. The magnetic flux density gradually decreases in the order of the region of level 2 enclosed by the curve Lv2, the region of level 3 enclosed by the curve Lv3, and the region of level 4 enclosed by the curve Lv4. Respective values of the magnetic flux densities represented by level 1 (Lv1) to level 4 (Lv4) illustrated in FIGS. 9A, 10A, 11A, 12A, and 13A are common to all of FIGS. 9A, 10A, 11A, 12A, and 13A.

In Experiment Example 2-3 (FIG. 11A), peripheral regions of the sensor chip 11 were included in the region of level 4 enclosed by the curve Lv4, whereas a middle region of the sensor chip 11 was included in a region of a magnetic flux density lower than level 4. One reason for this is that in Experiment Example 2-3 (FIG. 11A), the magnetic flux density tends to slightly decrease in the vicinity of a midpoint between the magnets 21 and 22. It was thus confirmed that it was easier for Experiment Example 2-3 (FIG. 11A) to exhibit a greater detection angle error with an increase in the amount of axis displacement of the center position CP than in Experiment Example 2-1 (FIG. 9A).

In Experiment Example 2-4 (FIG. 12A), the sensor chip 11 was included in a region of a magnetic flux density lower than level 4. Further, it was confirmed that in Experiment Example 2-4 (FIG. 12A), there was large unevenness in magnetic flux density distribution in a spatial region between the magnets 21 and 22.

In Experiment Example 2-5 (FIG. 13A), the sensor chip 11 was included in a region of a magnetic flux density lower than level 4. Further, it was confirmed that for Experiment Example 2-5 (FIG. 13A), it was difficult to achieve sufficient flatness of the magnetic flux density distribution in the spatial region between the magnets 21 and 22.

As described above, in Experiment Example 2-1 (FIG. 9A) corresponding to the angle detection apparatus 10 according to the present example embodiment, the yokes 31 and 32 each have a plan shape that is curved in an arc shape along the circumferential direction of a circle centered around the rotation axis J1 in a plane orthogonal to the rotation axis J1, and furthermore, the yokes 31 and 32 each include a portion that increases in height dimension along the rotation axis J1 with increasing distance from the rotation axis J1 along the plane orthogonal to the rotation axis J1. Such a configuration was found to be able to keep the detection angle error at the sensor chip 11 low even in a case where the position of the sensor chip 11 was displaced with respect to the position of the magnets 21 and 22 and the position of the yokes 31 and 32. Furthermore, it was confirmed that providing the yokes 31 and 32 having the above-described shape allowed the magnetic field generated by the magnets 21 and 22 to be efficiently applied to the sensor chip 11, and would therefore be helpful in achieving reductions in size and weight of the magnets 21 and 22.

Experiment Example 3-1

Next, aside from the magnetic field generated by the magnets 21 and 22, a disturbance magnetic field of 25 mT was applied to the angle detection apparatus 10 of FIG. 3 described in the foregoing example embodiment in a direction into the paper plane of FIG. 3 perpendicularly, i.e., in a direction orthogonal to the direction in which the magnets 21 and 22 are opposed to each other, and an influence of the disturbance magnetic field was examined. More specifically, an increment $\Delta By$ [mT] of the magnetic field in the direction of the disturbance magnetic field applied to the sensor chip 11 and a detection angle error $\Delta AE$ [deg.] relative to a case without application of the disturbance magnetic field were examined. The results are presented in Table 1.

TABLE 1

| | Magnetic shield | Yoke | $\Delta By$ [mT] | $\Delta AE$ [deg.] |
|---|---|---|---|---|
| Experiment Example 3-1 | Present (Cap shape) | Curved and tapered shape | 0.77 | 0.79 |
| Experiment Example 3-2 | Present (Cap shape) | Curved and flat-plate shape | 0.85 | 0.88 |
| Experiment Example 3-3 | Present (Cap shape) | Linear and tapered shape | 1.00 | 1.04 |
| Experiment Example 3-4 | Present (Cap shape) | Absent | 1.28 | 1.46 |
| Experiment Example 4-1 | Present (Cylindrical shape) | Curved and tapered shape | 2.47 | 2.43 |
| Experiment Example 5-1 | Absent | Curved and tapered shape | 16.54 | 13.34 |
| Experiment Example 5-2 | Absent | Curved and flat-plate shape | 18.82 | 15.45 |
| Experiment Example 5-3 | Absent | Linear and tapered shape | 19.80 | 15.71 |
| Experiment Example 5-4 | Absent | Absent | 23.54 | 20.56 |

Experiment Example 3-2

The angle detection apparatus 10A (FIG. 10A) having substantially the same configuration as that of the angle detection apparatus 10 illustrated in, e.g., FIG. 3 except for including the yoke unit 30A illustrated in FIG. 8A instead of the yoke unit 30 was subjected to a similar evaluation under similar conditions to those in Experiment Example 3-1 described above. The results are also presented in Table 1.

Experiment Example 3-3

The angle detection apparatus 10B (FIG. 11A) having substantially the same configuration as that of the angle detection apparatus 10 illustrated in, e.g., FIG. 3 except for including the yoke unit 30B illustrated in FIG. 8B instead of the yoke unit 30 was subjected to a similar evaluation under similar conditions to those in Experiment Example 3-1 described above. The results are also presented in Table 1.

Experiment Example 3-4

The angle detection apparatus 10C (FIG. 12A) having substantially the same configuration as that of the angle detection apparatus 10 illustrated in, e.g., FIG. 3 except for including no yokes 31 and 32 was subjected to a similar evaluation under similar conditions to those in Experiment Example 3-1 described above. The results are also presented in Table 1.

Experiment Example 4-1

Figure 14:
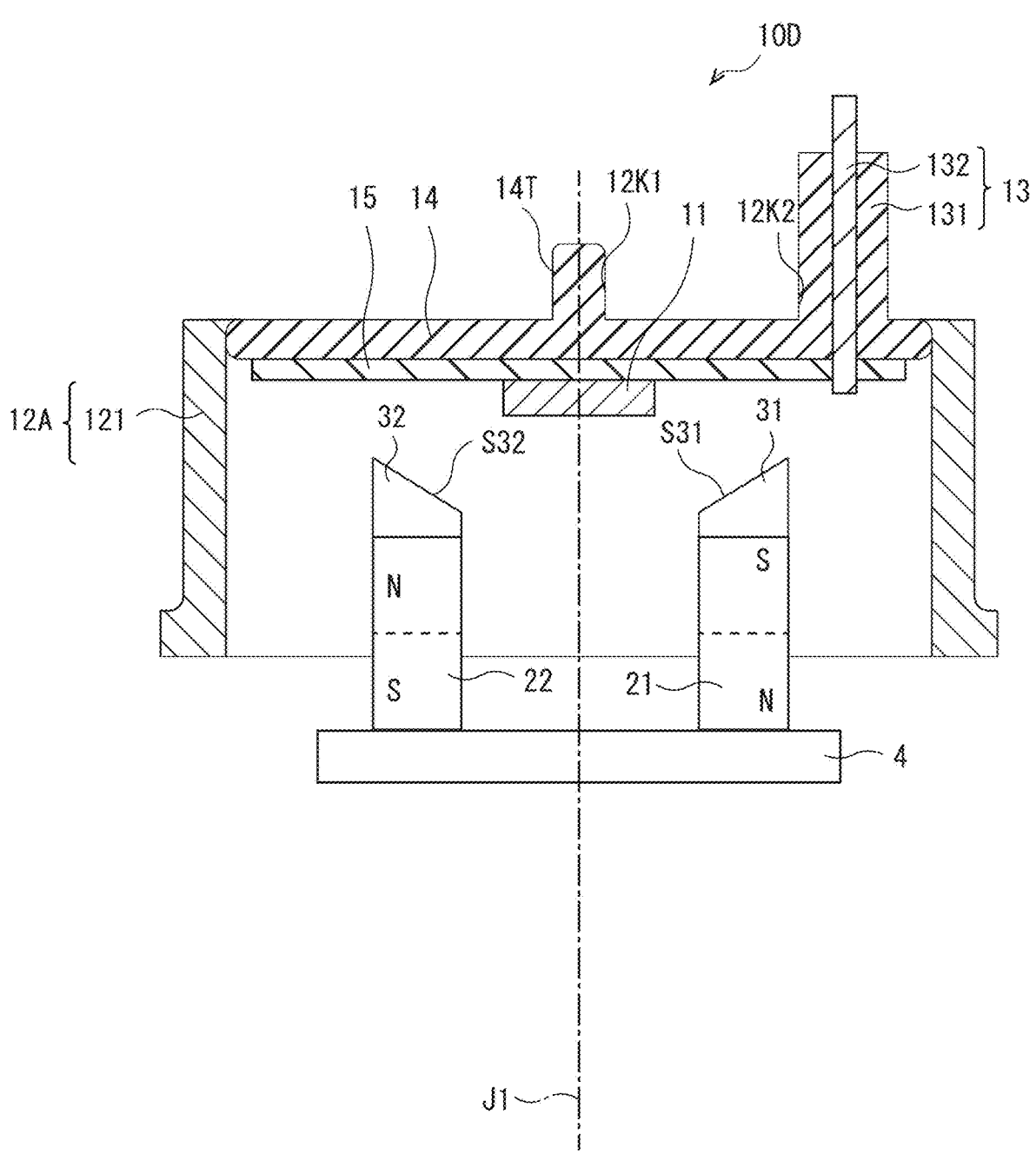
FIG. 14 is a cross-sectional view of an angle detection apparatus of Experiment Example 4-1.

An angle detection apparatus 10D (FIG. 14) having substantially the same configuration as that of the angle detection apparatus 10 illustrated in, e.g., FIG. 3 except that the magnetic shield 12 included only the first shield portion 121, in other words, except for including a magnetic shield 12A having a cylindrical shape, was subjected to a similar evaluation under similar conditions to those in Experiment Example 3-1 described above. The results are also presented in Table 1.

Experiment Example 5-1

An angle detection apparatus having substantially the same configuration as that of the angle detection apparatus 10 (FIG. 9A) except for including no magnetic shield 12 was subjected to a similar evaluation under similar conditions to those in Experiment Example 3-1 described above. The results are also presented in Table 1.

Experiment Example 5-2

An angle detection apparatus having substantially the same configuration as that of the angle detection apparatus 10A (FIG. 10A) except for including no magnetic shield 12 was subjected to a similar evaluation under similar conditions to those in Experiment Example 3-1 described above. The results are also presented in Table 1.

Experiment Example 5-3

An angle detection apparatus having substantially the same configuration as that of the angle detection apparatus 10B (FIG. 11A) except for including no magnetic shield 12 was subjected to a similar evaluation under similar conditions to those in Experiment Example 3-1 described above. The results are also presented in Table 1.

Experiment Example 5-4

An angle detection apparatus having substantially the same configuration as that of the angle detection apparatus 10 illustrated in, e.g., FIG. 3 except for including none of the yokes 31 and 32 and the magnetic shield 12 was subjected to a similar evaluation under similar conditions to those in Experiment Example 3-1 described above. The results are also presented in Table 1.

As indicated in Table 1, it was confirmed that Experiment Example 3-1 was best able to reduce the increment $\Delta$By [mT] of the magnetic field in the direction of the disturbance magnetic field applied to the sensor chip 11 and the detection angle error $\Delta$AE [deg.]. Further, from comparisons of Experiment Examples 3-1 to 3-4 with Experiment Examples 5-1 to 5-4, it was confirmed that providing the magnetic shield allowed for effective reduction of the increment $\Delta$By [mT] of the magnetic field in the direction of the disturbance magnetic field applied to the sensor chip 11 and the detection angle error $\Delta$AE [deg.], regardless of the presence or absence of the yokes or the shape of the yokes. Furthermore, it was confirmed that even the magnetic shield 12A of a cylindrical shape was able to sufficiently reduce the increment $\Delta$By [mT] of the magnetic field in the direction of the disturbance magnetic field applied to the sensor chip 11 and the detection angle error $\Delta$AE [deg.] as compared with the cases without the magnetic shield.

3. APPLICATION EXAMPLES

First Application Example

Figure 15A:
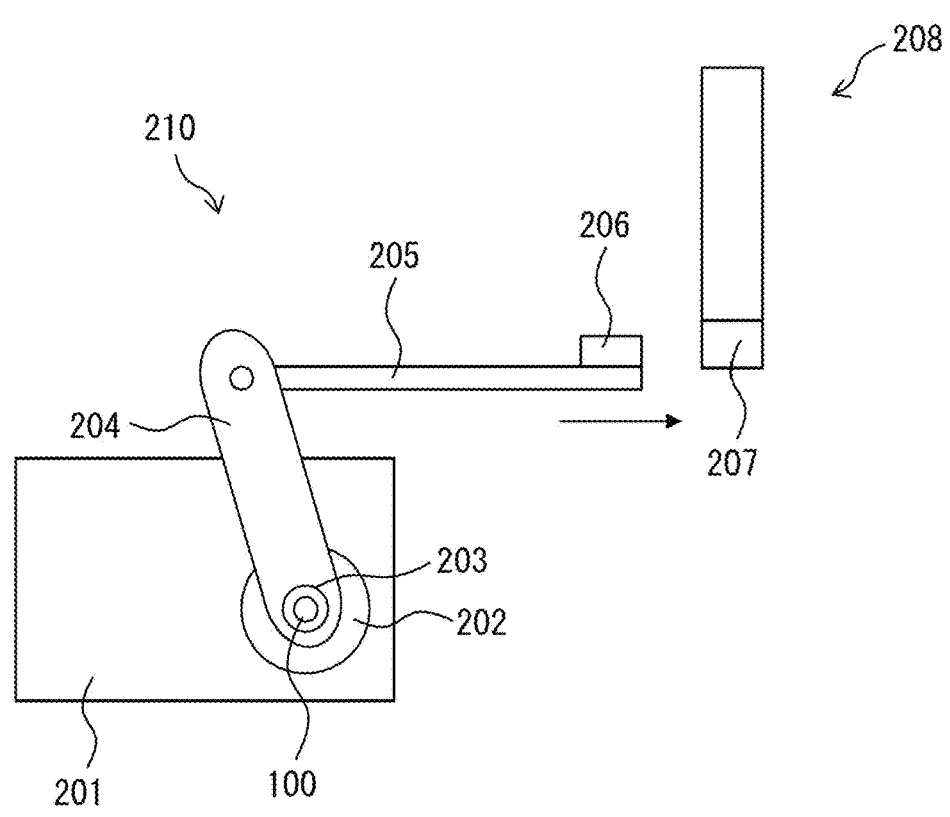
FIG. 15A is a first schematic diagram of a park lock system according to one application example to which the angle detection apparatus of the example embodiment of the technology is applied.
Figure 15B:
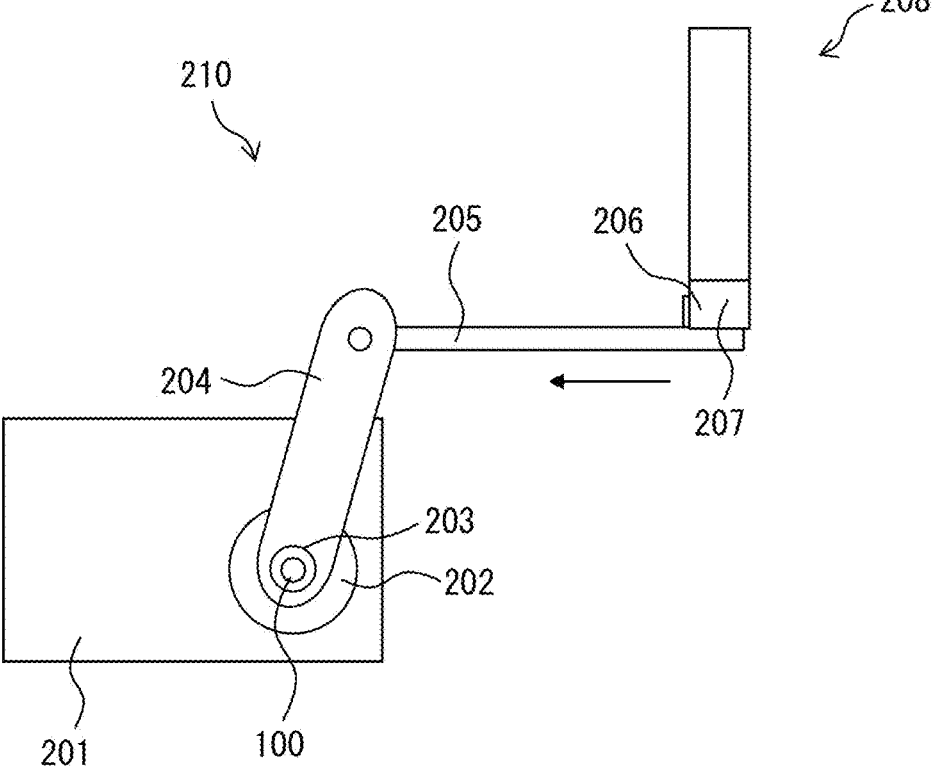
FIG. 15B is a second schematic diagram of the park lock system according to the application example to which the angle detection apparatus of the example embodiment of the technology is applied.

FIGS. 15A and 15B are schematic diagrams illustrating a park lock system 210 including the angle detection system 100 described in relation to the foregoing example embodiment. The park lock system 210 is a mechanism that may be installed in, for example, a vehicle such as an automobile and prevents unintentional movement of the vehicle once a shift lever has been shifted to a parking-mode position by a driver when the driver parks the vehicle in a parking lot or the like. FIG. 15A illustrates an unlocked state, and FIG. 15B illustrates a locked state. The park lock system 210 may include, for example, a motor 202 provided inside a housing 201, a shaft 203, a lever 204, a rod 205, an engagement part 206, and a parking gear 208 with gear teeth 207. The shaft 203 may extend in a direction perpendicular to the paper plane, for example, and may be rotatable by the motor 202. The angle detection system 100 of the foregoing example embodiment may be provided at an end of the shaft 203 to detect the rotation angle of the shaft 203. The lever 204 may extend parallel to the paper plane and have a proximal end fixed to the shaft 203. The lever 204 may be driven by the motor 202 to pivot along the paper plane. A proximal end of the rod 205 may be attached to a distal end of the lever 204. Pivoting of the lever 204 may cause the rod 205 to move in a horizontal direction in the paper plane. The engagement part 206 may be provided at a distal end of the rod 205 and configured to be engaged with and disengaged from the gear teeth 207. In the park lock system 210, rotation of the parking gear 208 may be restricted by a shift from the unlocked state illustrated in FIG. 15A to the locked state illustrated in FIG. 15B. In a more specific but non-limiting example, upon rotation of the shaft 203 and the lever 204 in a clockwise direction in the paper plane caused by rotation of the motor 202, the rod 205 may slide rightward in the paper plane to cause the engagement part 206 to be engaged with the gear teeth 207 to thereby lock the parking gear 208. The restriction of rotation of the parking gear 208 may be released by a shift from the locked state illustrated in FIG. 15B to the unlocked state illustrated in FIG. 15A. In a more specific but non-limiting example, upon rotation of the shaft 203 and the lever 204 in a counterclockwise direction in the paper plane caused by rotation of the motor 202, the rod 205 may slide leftward in the paper plane to cause the engagement part 206 to be separated from the gear teeth 207 to thereby unlock the parking gear 208. Here, the angle detection system 100 of the foregoing example embodiment may detect the rotation angle of the shaft 203 to thereby make it possible to identify whether the parking gear 208 is in the locked state or in the unlocked state with high accuracy.

Second Application Example

Figure 16A:
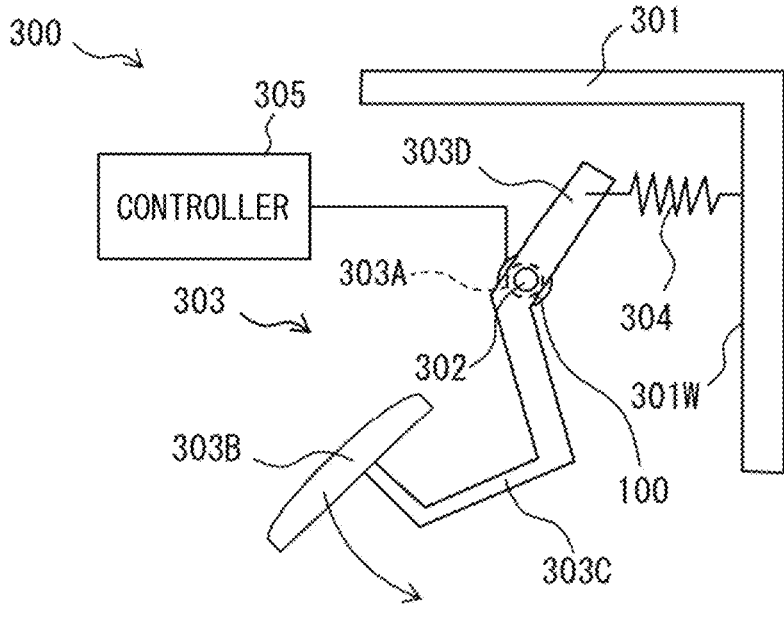
FIG. 16A is a first schematic diagram of a pedal system according to one application example to which the angle detection apparatus of the example embodiment of the technology is applied.
Figure 16B:
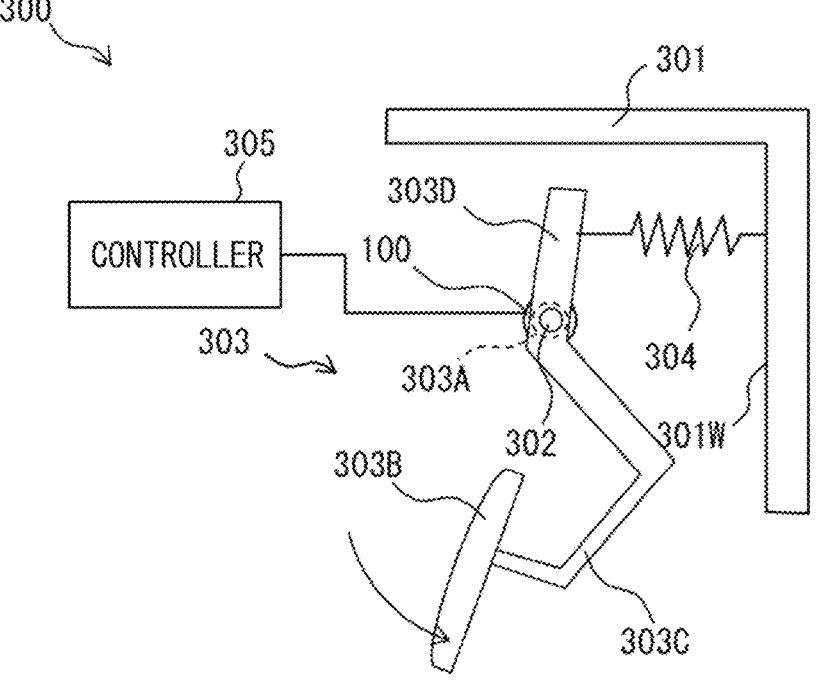
FIG. 16B is a second schematic diagram of the pedal system according to the application example to which the angle detection apparatus of the example embodiment of the technology is applied.

FIGS. 16A and 16B are schematic diagrams illustrating a pedal system 300 including the angle detection system 100 described in relation to the foregoing example embodiment. FIG. 16A illustrates an initial state in which a pad 303B (described later) of a pedal 303 is unoperated. FIG. 16B illustrates a depressed state where the pad 303B is operated.

The pedal system 300 may include, for example, a housing 301, a shaft 302 fixed to the housing 301, the pedal 303, and a biasing member 304 such as a tension spring. The pedal 303 may include a bearing 303A inside which the shaft 302 is to be disposed. The bearing 303A allows the pedal 303 to be rotationally movable about the shaft 302.

The pedal 303 may further include, for example, the pad 303B to be operated by a foot of a driver, an arm 303C coupling the pad 303B and the bearing 303A to each other, and a lever 303D provided on a side of the bearing 303A opposite to a side thereof on which the arm 303C is provided. The lever 303D may be coupled to the biasing member 304 and configured to be biased by the biasing member 304 toward a wall 301W of the housing 301.

The angle detection system 100 may be provided near the bearing 303A and configured to accurately detect the rotation angle of the arm 303C rotatable about the shaft 302, and to transmit a voltage signal (a proportional signal) corresponding to the rotation angle to a controller 305. The controller 305 may analyze the voltage signal and control opening and closing operations of a throttle valve to achieve a throttle valve position corresponding to the voltage signal.

In the pedal system 300, when the pad 303B in the initial state illustrated in FIG. 16A is depressed by the driver, the pedal 303 rotates counterclockwise about the shaft 302 in the paper plane to shift to a depressed state illustrated in FIG. 16B. At this time, the degree of opening of the throttle valve increases. In contrast, when the driver decreases the amount of depressing of the pad 303B or stops depressing the pad 303B, the depressed state illustrated in FIG. 16B shifts to the initial state illustrated in FIG. 16A. At this time, the degree of opening of the throttle valve decreases.

As described above, in the pedal system 300, the angle detection system 100 of the foregoing example embodiment is able to detect the rotation angle of the arm 303C accurately. This makes it possible to adjust the throttle valve position with high accuracy.

5. OTHER MODIFICATION EXAMPLES

The technology has been described hereinabove with reference to the example embodiment and some modification examples. However, the technology is not limited thereto, and may be modified in a variety of ways. For example, the foregoing example embodiment, etc. have been described with reference to an example case where a vertical Hall element is used as the magnetic detection element. However, in embodiments of the technology, the magnetic detection element may be any element having a function of detecting a magnetic field. The term "magnetic detection element" conceptually encompasses also magnetoresistive effect (MR) elements including, without limitation, an anisotropic magnetoresistive effect (AMR) element, a spin-valve giant magnetoresistive effect (GMR) element, and a tunneling magnetoresistive (TMR) element. In a case of using an MR element such as the GMR element or the TMR element, the MR element may detect changes in direction and/or intensity of a magnetic field in a plane orthogonal to the rotation axis J1. Because the technology makes it possible to reduce unevenness of a magnetic field intensity distribution (a magnetic flux density distribution) not only in the rotation axis direction but also in a plane orthogonal to the rotation axis, a magnetic detection element that detects changes in direction and/or intensity of a magnetic field in a plane orthogonal to the rotation axis J1, such as the MR element, is considered to be applicable. The dimensions of the components and the layouts of the components are merely illustrative, and are not limited thereto.

Further, the foregoing example embodiment and the modification examples have been described with reference to an example case where the sensor chip 11 including the magnetic detection element 41 is fixed and where the yoke unit 30 and the magnetic field generation unit 20 are rotatable together; however, embodiments of the technology are not limited thereto. In some embodiments of the technology, for example, the magnets and the yokes may be fixed, and the magnetic detection element may be rotatable around the rotation axis. Alternatively, both the magnetic detection element and the combination of the magnets and the yokes may be rotatable around the same rotation axis.

Further, the foregoing example embodiment, etc. have been described with reference to an example case where the sensor module 1 of the angle detection apparatus 10 includes the single magnetic detection element 41; however, embodiments of the technology are not limited thereto. In some embodiments of the technology, the angle detection apparatus may include two or more magnetic detection elements, for example. In such a case, all the two or more magnetic detection elements may be disposed on the rotation axis, or all or some of the two or more magnetic detection elements may be disposed around the rotation axis. In other words, the two or more magnetic detection elements may be provided around the rotation axis at mutually different positions in a plane orthogonal to the rotation axis direction along the rotation axis. In one example, a center position located at equal distances from the two or more magnetic detection elements may coincide with the position of the rotation axis. In a case of disposing the two or more magnetic detection elements around the rotation axis, the magnetic detection elements may be disposed between the rotation axis and the magnets in an in-plane direction along a plane orthogonal to the rotation axis.

Further, the foregoing example embodiment, etc. have been described with reference to an example case where the magnetic field generation unit 20 of the angle detection apparatus 10 includes two magnets as the magnetic field generators; however, embodiments of the technology are not limited thereto. In some embodiments of the technology, the angle detection apparatus may include, for example, only a single magnetic field generator, or three or more magnetic field generators.

It is possible to achieve at least the following configurations from the foregoing embodiments and modification examples of the technology.

(1)
An angle detection apparatus including:
a magnetic detection element;
a magnetic field generator magnetized along a first direction and generating a magnetic field to be applied to the magnetic detection element; and
a first magnetic shield surrounding the magnetic detection element along a plane orthogonal to the first direction, in which the magnetic field generator and the magnetic detection element are rotatable relative to each other around a rotation axis along the first direction.

(2)

The angle detection apparatus according to (1), in which the magnetic field generator is provided around the rotation axis.

(3)

The angle detection apparatus according to (1) or (2), in which a plurality of the magnetic field generators is disposed around the rotation axis, the magnetic field generators being spaced apart from each other.

(4)

The angle detection apparatus according to any one of (1) to (3), in which, in an in-plane direction along the plane orthogonal to the first direction, the magnetic detection element is disposed at a position coinciding with the rotation axis or at a position between the magnetic field generator and the rotation axis.

(5)

The angle detection apparatus according to (3), in which the magnetic field generators are substantially identical in material, shape, and size.

(6)

The angle detection apparatus according to (4) or (5), in which a plurality of the magnetic field generators is disposed around the rotation axis, the magnetic field generators being spaced apart from each other, and the magnetic field generators are at substantially equal distances from the rotation axis.

(7)

The angle detection apparatus according to any one of (1) to (6), further including a second magnetic shield provided opposite to the magnetic field generator with respect to the magnetic detection element.

(8)

The angle detection apparatus according to (7), in which the first magnetic shield and the second magnetic shield are integral with each other.

(9)

The angle detection apparatus according to any one of (1) to (8), in which a first distance between the first magnetic shield and the rotation axis is greater than a second distance between the magnetic field generator and the rotation axis.

(10)

The angle detection apparatus according to (9), in which at least a portion of the magnetic field generator is positioned to overlap the first magnetic shield in an in-plane direction along the plane orthogonal to the first direction.

(11)

The angle detection apparatus according to any one of (1) to (10), further including a yoke disposed between the magnetic detection element and the magnetic field generator in the first direction, in which the magnetic detection element and a combination of the magnetic field generator and the yoke are rotatable relative to each other around the rotation axis.

(12)

The angle detection apparatus according to (11), in which the yoke is positioned to overlap the magnetic field generator in the first direction.

(13)

The angle detection apparatus according to (11) or (12), in which the yoke is in contact with the magnetic field generator.

(14)

The angle detection apparatus according to any one of (11) to (13), in which a dimension of the magnetic field generator in the first direction is greater than a dimension of the yoke in the first direction.

(15)

The angle detection apparatus according to any one of (11) to (14), in which, in a plane orthogonal to the rotation axis, the yoke has a plan shape that is curved in an arc shape along a circumferential direction of a circle centered around the rotation axis.

(16)

The angle detection apparatus according to (15), in which the yoke includes a portion that increases in dimension in the first direction with increasing distance from the rotation axis along the plane orthogonal to the rotation axis.

(17)

The angle detection apparatus according to (15) or (16), in which the yoke includes an inclined surface that is inclined with respect to the rotation axis and also inclined with respect to the plane orthogonal to the rotation axis.

(18)

The angle detection apparatus according to any one of (11) to (17), in which a plurality of the yokes is disposed around the rotation axis, the yokes being spaced apart from each other.

(19)

The angle detection apparatus according to (18), in which the yokes are substantially identical in material, shape, and size.

(20)

The angle detection apparatus according to (18) or (19), in which the yokes are at substantially equal distances from the rotation axis.

(21)

The angle detection apparatus according to any one of (18) to (20), in which the plurality of yokes includes a first yoke and a second yoke that are opposed to each other with the rotation axis therebetween.

(22)

The angle detection apparatus according to any one of (1) to (21), in which the magnetic detection element has a sensitive axis along the plane orthogonal to the first direction.

(23)

The angle detection apparatus according to any one of (1) to (22), in which the magnetic detection element includes a plurality of the magnetic detection elements.

(24)

The angle detection apparatus according to (23), in which the magnetic detection elements are provided at mutually different positions along the plane orthogonal to the first direction.

(25)

An angle detection system including:

the angle detection apparatus according to any one of (1) to (24);

a first support supporting the magnetic field generator; and a second support supporting the first magnetic shield.

(26)

An angle detection apparatus including:

a magnetic detection element;

a magnetic field generator generating a magnetic field to be applied to the magnetic detection element; and a yoke disposed between the magnetic detection element and the magnetic field generator in a first direction, in which the magnetic detection element and a combination of the magnetic field generator and the yoke are rotatable relative to each other around a rotation axis along the first direction, in a plane orthogonal to the rotation axis, the yoke has a plan shape that is curved in an arc shape along a circumferential direction of a circle centered around the rotation axis, and the yoke includes a portion that increases in dimension in the first direction with increasing distance from the rotation axis along the plane orthogonal to the rotation axis.

(27)

The angle detection apparatus according to (26), in which the yoke includes an inclined surface that is inclined with respect to the rotation axis and also inclined with respect to the plane orthogonal to the rotation axis.

(28)

The angle detection apparatus according to (26) or (27), in which the yoke is positioned to overlap the magnetic field generator in the first direction.

(29)

The angle detection apparatus according to any one of (26) to (28), in which the yoke is in contact with the magnetic field generator.

(30)

The angle detection apparatus according to any one of (26) to (29), in which a dimension of the magnetic field generator in the first direction is greater than a dimension of the yoke in the first direction.

(31)

The angle detection apparatus according to any one of (26) to (30), in which a plurality of the yokes is disposed around the rotation axis, the yokes being spaced apart from each other.

(32)

The angle detection apparatus according to (31), in which the yokes are substantially identical in material, shape, and size.

(33)

The angle detection apparatus according to (31) or (32), in which the yokes are at substantially equal distances from the rotation axis.

(34)

The angle detection apparatus according to any one of (31) to (33), in which the plurality of yokes includes a first yoke and a second yoke that are opposed to each other with the rotation axis therebetween.

(35)

The angle detection apparatus according to (26) to (33), further including a first magnetic shield surrounding the magnetic detection element along a plane orthogonal to the first direction.

(36)

The angle detection apparatus according to (35), further including a second magnetic shield provided opposite to the magnetic field generator with respect to the magnetic detection element.

(37)

The angle detection apparatus according to (36), in which the first magnetic shield and the second magnetic shield are integral with each other.

(38)

The angle detection apparatus according to any one of (35) to (37), in which a first distance between the first magnetic shield and the rotation axis is greater than a second distance between the magnetic field generator and the rotation axis.

(39)

The angle detection apparatus according to (38), in which at least a portion of the magnetic field generator is positioned to overlap the first magnetic shield in an in-plane direction along the plane orthogonal to the first direction.

(40)

The angle detection apparatus according to any one of (26) to (39), in which the magnetic field generator is magnetized along the first direction.

(41)

The angle detection apparatus according to any one of (26) to (40), in which the magnetic field generator is provided around the rotation axis.

(42)

The angle detection apparatus according to any one of (26) to (41), in which a plurality of the magnetic field generators is disposed around the rotation axis, the magnetic field generators being spaced apart from each other.

(43)

The angle detection apparatus according to any one of (26) to (42), in which, in an in-plane direction along a plane orthogonal to the first direction, the magnetic detection element is disposed at a position coinciding with the rotation axis or at a position between the magnetic field generator and the rotation axis.

(44)

The angle detection apparatus according to (42), in which the magnetic field generators are substantially identical in material, shape, and size.

(45)

The angle detection apparatus according to (42) or (44), in which the magnetic field generators are at substantially equal distances from the rotation axis.

(46)

The angle detection apparatus according to any one of (26) to (45), in which the magnetic detection element has a sensitive axis along a plane orthogonal to the first direction.

(47)

The angle detection apparatus according to any one of (26) to (46), in which the magnetic detection element incudes a plurality of the magnetic detection elements.

(48)

The angle detection apparatus according to (47), in which the magnetic detection elements are provided at mutually different positions along a plane orthogonal to the first direction.

(49)

An angle detection system including:

the angle detection apparatus according to any one of (26) to (48); and a support supporting the magnetic field generator, in which the support has an attachment hole, and the yoke is provided on the magnetic field generator or on the support.

(50)

A park lock system including the angle detection system according to (25) or (49).

(51)

A pedal system including the angle detection system according to (25) or (49).

According to the angle detection apparatus, the angle detection system, the park lock system, and the pedal system of at least one embodiment of the technology, the magnetic detection element is shielded from a disturbance magnetic field by the first magnetic shield. This makes it possible to achieve high angle detection accuracy. Further, because the magnetic field generator is magnetized along the first direction, it is possible to effectively apply the magnetic field generated by the magnetic field generator to the magnetic detection element. This makes it possible to reduce size and weight of the magnetic field generator. Accordingly, the angle detection apparatus, the angle detection system, the park lock system, and the pedal system of at least one embodiment of the technology are each able to achieve high detection accuracy while being compact and lightweight.

According to the angle detection apparatus, the angle detection system, the park lock system, and the pedal system of at least one embodiment of the technology, in a plane orthogonal to the rotation axis, the yoke has a plan shape that is curved in an arc shape along the circumferential direction of a circle centered around the rotation axis, and further, the yoke includes a portion that increases in dimension in the first direction with increasing distance from the rotation axis along the plane orthogonal to the rotation axis. This makes it possible to achieve high angle detection accuracy even in a case where there occurs a displacement of the relative position between the magnetic detection element and a combination of the magnetic field generator and the yoke.

Although the technology has been described hereinabove in terms of the example embodiment and modification examples, the technology is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. An angle detection apparatus comprising:
   a magnetic detection element;
   a first magnetic field generator magnetized parallel to a first direction and generating a magnetic field to be applied to the magnetic detection element;
   a second magnetic field generator magnetized in a direction opposite to the first direction,
   a first magnetic shield surrounding the magnetic detection element along a plane orthogonal to the first direction; and
   a first yoke disposed between the magnetic detection element and the first magnetic field generator in the first direction,
   a second yoke disposed between the magnetic detection element and the second magnetic field generator in the first direction, wherein the magnetic detection element and the magnetic field generators are rotatable relative to each other around a rotation axis along the first direction,
   the yokes and the magnetic detection element are rotatable relative to each other around the rotation axis along the first direction,
   in an in-plane direction along the plane orthogonal to the first direction, the magnetic detection element is disposed at a position coinciding with the rotation axis or at a position at a smaller distance from the rotation axis than a distance from the rotation axis to the magnetic field generators,
   the first yoke is positioned to overlap the first magnetic field generator in the first direction,
   the second yoke is positioned to overlap the second magnetic field generator in the first direction, and
   wherein the first yoke includes a portion that increases in dimension in the first direction with increasing distance from the rotation axis along the plane orthogonal to the rotation axis.

2. The angle detection apparatus according to claim 1 wherein the first and second magnetic field generators are substantially identical in material, shape, and size.

3. The angle detection apparatus according to claim 1, wherein
   the first and second magnetic field generators are at substantially equal distances from the rotation axis.

4. The angle detection apparatus according to claim 1, further comprising a second magnetic shield provided opposite to the magnetic field generators with respect to the magnetic detection element.

5. The angle detection apparatus according to claim 4, wherein the first magnetic shield and the second magnetic shield are integral with each other.

6. The angle detection apparatus according to claim 1, wherein a first distance between the first magnetic shield and the rotation axis is greater than a second distance between the magnetic field generators and the rotation axis.

7. The angle detection apparatus according to claim 6, wherein at least a portion of the first magnetic field generator or the second magnetic field generator is positioned to overlap the first magnetic shield in the in-plane direction along the plane orthogonal to the first direction.

8. The angle detection apparatus according to claim 1, wherein the first yoke is in contact with the first magnetic field generator.

9. The angle detection apparatus according to claim 1, wherein a dimension of the first magnetic field generator in the first direction is greater than a dimension of the first yoke in the first direction.

10. The angle detection apparatus according to claim 1, wherein the first and second yokes are substantially identical in material, shape, and size.

11. The angle detection apparatus according to claim 1, wherein the first and second yokes are at substantially equal distances from the rotation axis.

12. The angle detection apparatus according to claim 1, wherein the first yoke and the second yoke are opposed to each other with the rotation axis therebetween.

13. The angle detection apparatus according to claim 1, wherein the magnetic detection element has a sensitive axis along the plane orthogonal to the first direction.

14. The angle detection apparatus according to claim 1, wherein the magnetic detection element comprises a plurality of the magnetic detection elements.

15. The angle detection apparatus according to claim 14, wherein the magnetic detection elements are provided at mutually different positions along the plane orthogonal to the first direction.

16. An angle detection system including:

the angle detection apparatus according to claim 1;

a first support supporting the first and second magnetic field generators; and a second support supporting the first magnetic shield.

17. A park lock system including the angle detection system according to claim 16.

18. A pedal system including the angle detection system according to claim 16.

19. An angle detection apparatus comprising:

a magnetic detection element;

a first magnetic field generator magnetized parallel to a first direction and generating a magnetic field to be applied to the magnetic detection element;

a second magnetic field generator magnetized in a direction opposite to the first direction, a first magnetic shield surrounding the magnetic detection element along a plane orthogonal to the first direction; and a first yoke disposed between the magnetic detection element and the first magnetic field generator in the first direction, a second yoke disposed between the magnetic detection element and the second magnetic field generator in the first direction, wherein the magnetic detection element and the magnetic field generators are rotatable relative to each other around a rotation axis along the first direction, the yokes and the magnetic detection element are rotatable relative to each other around the rotation axis along the first direction, in an in-plane direction along the plane orthogonal to the first direction, the magnetic detection element is disposed at a position coinciding with the rotation axis or at a position at a smaller distance from the rotation axis than a distance from the rotation axis to the magnetic field generators, and the first yoke is positioned to overlap the first magnetic field generator in the first direction, the second yoke is positioned to overlap the second magnetic field generator in the first direction, and wherein the first yoke includes an inclined surface that is inclined with respect to the rotation axis and also inclined with respect to the plane orthogonal to the rotation axis.

20. The angle detection apparatus according to claim 19, wherein the first and second magnetic field generators are substantially identical in material, shape, and size.

21. The angle detection apparatus according to claim 19, wherein the first and second magnetic field generators are at substantially equal distances from the rotation axis.

22. The angle detection apparatus according to claim 19, further comprising a second magnetic shield provided opposite to the magnetic field generators with respect to the magnetic detection element.

23. The angle detection apparatus according to claim 22, wherein the first magnetic shield and the second magnetic shield are integral with each other.

24. The angle detection apparatus according to claim 19, wherein a first distance between the first magnetic shield and the rotation axis is greater than a second distance between the magnetic field generators and the rotation axis.

25. The angle detection apparatus according to claim 24, wherein at least a portion of the first magnetic field generator or the second magnetic field generator is positioned to overlap the first magnetic shield in the in-plane direction along the plane orthogonal to the first direction.

26. The angle detection apparatus according to claim 19, wherein the first yoke is in contact with the first magnetic field generator.

27. The angle detection apparatus according to claim 19, wherein a dimension of the first magnetic field generator in the first direction is greater than a dimension of the first yoke in the first direction.

28. The angle detection apparatus according to claim 19, wherein the first and second yokes are substantially identical in material, shape, and size.

29. The angle detection apparatus according to claim 19, wherein the first and second yokes are at substantially equal distances from the rotation axis.

30. The angle detection apparatus according to claim 19, wherein the first yoke and the second yoke are opposed to each other with the rotation axis therebetween.

31. The angle detection apparatus according to claim 19, wherein the magnetic detection element has a sensitive axis along the plane orthogonal to the first direction.

32. The angle detection apparatus according to claim 19, wherein the magnetic detection element comprises a plurality of the magnetic detection elements.

33. The angle detection apparatus according to claim 32, wherein the magnetic detection elements are provided at mutually different positions along the plane orthogonal to the first direction.

34. An angle detection system including:

the angle detection apparatus according to claim 19;

a first support supporting the first and second magnetic field generators; and a second support supporting the first magnetic shield.

35. A park lock system including the angle detection system according to claim 34.

36. A pedal system including the angle detection system according to claim 34.

* * * * *